(12) United States Patent
Rezaei et al.

(10) Patent No.: US 11,890,561 B2
(45) Date of Patent: *Feb. 6, 2024

(54) FILTER MEDIA HAVING A FINE PORE SIZE DISTRIBUTION

(71) Applicant: Hollingsworth & Vose Company, East Walpole, MA (US)

(72) Inventors: Farzad Rezaei, Floyd, VA (US); Abdoulaye Doucouré, Roanoke, VA (US)

(73) Assignee: Hollingsworth & Vose Company, East Walpole, MA (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/884,819

(22) Filed: Aug. 10, 2022

(65) Prior Publication Data

US 2023/0045984 A1    Feb. 16, 2023

Related U.S. Application Data

(63) Continuation of application No. 16/206,566, filed on Nov. 30, 2018, now Pat. No. 11,452,959.

(51) Int. Cl.
*B01D 39/16* (2006.01)
*B01D 61/14* (2006.01)

(52) U.S. Cl.
CPC ......... *B01D 39/163* (2013.01); *B01D 61/145* (2013.01); *B01D 61/147* (2013.01);
(Continued)

(58) Field of Classification Search
None
See application file for complete search history.

(56) References Cited

U.S. PATENT DOCUMENTS

| | | | |
|---|---|---|---|
| 4,107,364 A | * | 8/1978 | Sisson ............... D04H 3/16 428/196 |
| 4,880,548 A | | 11/1989 | Pall et al. |

(Continued)

FOREIGN PATENT DOCUMENTS

| | | |
|---|---|---|
| CN | 106676752 A | 5/2017 |
| EP | 2816006 A1 | 12/2014 |

(Continued)

OTHER PUBLICATIONS

International Search Report and Written Opinion for PCT/US2019/063521 dated Feb. 7, 2020.
(Continued)

*Primary Examiner* — Brit E. Anbacht
(74) *Attorney, Agent, or Firm* — Wolf, Greenfield & Sacks, P.C.

(57) ABSTRACT

Filter media having a relatively small pore size and related components, systems, and methods associated therewith are provided. The filter media may include a fibrous efficiency layer, a fibrous support layer, and a third layer adjacent to the efficiency layer. The efficiency layer may impart a relatively homogeneous pore structure to the filter media without adding substantial bulk to the filter media. The support layer may promote the homogeneity of the pore structure. For example, the support layer may prevent and/or minimize defects in the relatively thin efficiency layer that may result from manufacturing and/or processing. The third layer may serve to impart beneficial filtration (e.g., efficiency, dust holding capacity) and/or non-filtration (e.g., layer protection) properties to the filter media without adversely affecting one or more properties of the filter media. Filter media, as described herein, may be particularly well-suited for applications that involve liquid filtration, amongst other applications.

20 Claims, 7 Drawing Sheets

(52) U.S. Cl.
CPC .............. *B01D 2239/065* (2013.01); *B01D 2239/1216* (2013.01); *B01D 2239/1233* (2013.01); *B01D 2239/1291* (2013.01)

(56) References Cited

U.S. PATENT DOCUMENTS

| | | | |
|---|---|---|---|
| 4,925,572 A | 5/1990 | Pall | |
| 5,472,600 A | 12/1995 | Ellefson et al. | |
| 5,580,459 A | 12/1996 | Powers et al. | |
| 5,582,907 A | 12/1996 | Pall | |
| 5,672,399 A | 9/1997 | Kahlbaugh et al. | |
| 5,785,725 A | 7/1998 | Cusick et al. | |
| 5,855,788 A | 1/1999 | Everhart et al. | |
| 6,074,869 A | 6/2000 | Pall et al. | |
| 6,171,684 B1 | 1/2001 | Kahlbaugh et al. | |
| 6,395,046 B1 | 5/2002 | Emig et al. | |
| 6,811,594 B1 | 11/2004 | Collingwood et al. | |
| 7,008,465 B2 | 3/2006 | Graham et al. | |
| 7,137,510 B1 | 11/2006 | Klein et al. | |
| 7,314,497 B2 | 1/2008 | Kahlbaugh et al. | |
| 8,357,220 B2* | 1/2013 | Guimond | B01D 39/1615 55/528 |
| 8,784,542 B2 | 7/2014 | Dullaert et al. | |
| 8,882,876 B2* | 11/2014 | Battenfeld | B01D 39/2024 55/486 |
| 9,149,748 B2* | 10/2015 | Nagy | B01D 39/1615 |
| 9,149,749 B2* | 10/2015 | Nagy | B01D 39/1623 |
| 9,220,998 B2 | 12/2015 | Seo et al. | |
| 9,352,267 B2* | 5/2016 | Krupnikov | B01D 39/18 |
| 9,511,330 B2* | 12/2016 | Yu | B01D 39/2017 |
| 10,155,186 B2* | 12/2018 | Cox | B32B 5/26 |
| 10,399,024 B2* | 9/2019 | Swaminathan | B01D 46/003 |
| 10,682,595 B2 | 6/2020 | Thomson et al. | |
| 10,828,587 B2 | 11/2020 | Doucouré et al. | |
| 11,452,959 B2* | 9/2022 | Rezaei | B01D 69/12 |
| 2006/0060085 A1 | 3/2006 | Ptak et al. | |
| 2006/0090650 A1 | 5/2006 | Yamakawa et al. | |
| 2006/0094320 A1 | 5/2006 | Chen et al. | |
| 2006/0096263 A1* | 5/2006 | Kahlbaugh | B01D 46/10 55/528 |
| 2009/0120048 A1* | 5/2009 | Wertz | B01D 39/1623 55/522 |
| 2009/0249956 A1 | 10/2009 | Chi et al. | |
| 2010/0000411 A1* | 1/2010 | Wertz | B01D 39/1623 55/486 |
| 2010/0136865 A1* | 6/2010 | Bletsos | D06M 14/08 442/60 |
| 2010/0181249 A1 | 7/2010 | Green et al. | |
| 2010/0279566 A1* | 11/2010 | Yang | H01G 4/18 156/308.2 |
| 2011/0003524 A1 | 1/2011 | Claasen et al. | |
| 2011/0147976 A1 | 6/2011 | Wertz et al. | |
| 2011/0185903 A1* | 8/2011 | Fox | D04H 3/14 96/15 |
| 2011/0210081 A1 | 9/2011 | Green et al. | |
| 2012/0091072 A1 | 4/2012 | Kozlov et al. | |
| 2012/0137885 A1 | 6/2012 | Dullaert et al. | |
| 2012/0152824 A1 | 6/2012 | Cox et al. | |
| 2012/0318754 A1 | 12/2012 | Cox et al. | |
| 2013/0092622 A1 | 4/2013 | Kas et al. | |
| 2013/0118973 A1 | 5/2013 | Seo et al. | |
| 2013/0251921 A1* | 9/2013 | Gane | C04B 28/02 423/430 |
| 2013/0256230 A1 | 10/2013 | Dullaert et al. | |
| 2013/0333341 A1* | 12/2013 | Witsch | B01D 46/527 162/157.1 |
| 2014/0083066 A1 | 3/2014 | Bahukudumbi et al. | |
| 2014/0116945 A1 | 5/2014 | Kas et al. | |
| 2014/0326661 A1 | 11/2014 | Madsen et al. | |
| 2015/0298070 A1 | 10/2015 | Kozlov et al. | |
| 2016/0051918 A1* | 2/2016 | Walz | B01D 39/18 55/486 |
| 2016/0136584 A1 | 5/2016 | Hwang et al. | |
| 2016/0175752 A1 | 6/2016 | Jaganathan et al. | |
| 2016/0184751 A1 | 6/2016 | Wertz et al. | |
| 2016/0303498 A1* | 10/2016 | Doucouré | B01D 39/2017 |
| 2017/0360970 A1 | 12/2017 | Kozlov et al. | |
| 2018/0169551 A1 | 6/2018 | Jaganathan et al. | |
| 2018/0215088 A1* | 8/2018 | Leng | B29C 48/08 |
| 2019/0282962 A1* | 9/2019 | Konda | B01D 69/06 |
| 2020/0002853 A1 | 1/2020 | Ito | |
| 2020/0171418 A1* | 6/2020 | Rezaei | B01D 61/145 |
| 2020/0290044 A1* | 9/2020 | Vetter | C12M 47/10 |
| 2021/0093989 A1 | 4/2021 | Doucouré et al. | |
| 2021/0187421 A1 | 6/2021 | Healey et al. | |
| 2022/0241710 A1 | 8/2022 | Vitchuli et al. | |

FOREIGN PATENT DOCUMENTS

| | | | | |
|---|---|---|---|---|
| JP | 2009-066534 A | 4/2009 | | |
| JP | 2016-112520 A | 6/2016 | | |
| JP | 2017-101346 A | 6/2017 | | |
| WO | WO 89/03717 A1 | 5/1989 | | |
| WO | WO 2013/192392 A1 | 12/2013 | | |
| WO | WO-2013192392 A1 * | 12/2013 | ......... B01D 39/1623 |
| WO | WO 2014/093345 A1 | 6/2014 | | |

OTHER PUBLICATIONS

[No Author Listed], Nanofine-Pure Filter Cartridges. TPR Type (Nylon Nanofiber Media). Roki Techno Co., Ltd. Tokyo, Japan. As available Apr. 26, 2016 at <http://www.rokitechno.com/pdf/TPR_E.pdf>. 2 pages.

Guibo et al., The electrospun polyamide 6 nanofiber membranes used as high efficiency filter materials: Filtration potential, thermal treatment, and their continuous production. Journal of Applied Polymer Science. Apr. 2013;128(2):1061-9.

Homaeigohar et al., Polyethersulfone electrospun nanofibrous composite membrane for liquid filtration. Journal of Membrane Science. Dec. 2010;365(1-2):68-77.

Huang et al., Increasing strength of electrospun nanofiber membranes for water filtration using solvent vapor. Journal of Membrane Science. Jun. 2013;436:213-20.

U.S. Appl. No. 17/039,527, filed Sep. 30, 2020, Doucouré et al.
U.S. Appl. No. 16/206,566, filed Nov. 30, 2018, Rezaei et al
U.S. Appl. No. 17/165,853, filed Feb. 2, 2021, Vitchuli et al.
PCT/US2019/063521, Feb. 7, 2020, International Search Report and Written Opinion.

* cited by examiner

FILTER MEDIA HAVING A FINE PORE SIZE DISTRIBUTION

RELATED APPLICATIONS

This application is a continuation of U.S. application Ser. No. 16/206,566, filed Nov. 30, 2018, which is incorporated herein by reference in its entirety.

BACKGROUND

Filter elements can be used to remove contamination in a variety of applications. Such elements can include a filter media which may be formed of a web of fibers. The fiber web provides a porous structure that permits fluid (e.g., gas, liquid) to flow through the media. Contaminant particles (e.g., dust, floccules, precipitates, organic matter, mineral or metallic oxides, micro pollutants, microorganism particles, virus particles, biological cells, debris from biological cells, and biomolecular aggregates) contained within the fluid may be trapped on or in the fiber web. Depending on the application, the filter media may be designed to have different performance characteristics such as enhanced particulate efficiency. Fiber web characteristics (e.g., pore size, fiber dimensions, fiber composition, basis weight, amongst others) affect filtration performance of the media. Although different types of filter media are available, improvements are needed.

SUMMARY

Filter media having a relatively small pore size and related components, systems, and methods associated therewith are provided. The subject matter of this application involves, in some cases, interrelated products, alternative solutions to a particular problem, and/or a plurality of different uses of structures and compositions.

In one set of embodiments, filter media are provided. In one embodiments, a filter media comprises a first fiber web comprising first fibers having an average diameter of less than or equal to about 0.5 microns and a thickness of less than or equal to about 200 microns; a calendered fiber web directly adjacent to the first fiber web; and a third fiber web bonded to the first fiber web, wherein the filter media has a maximum pore size of greater than or equal to about 0.1 microns and less than or equal to about 2.5 microns and a full width at half maximum of a pore size distribution of less than or equal to about 0.2 microns.

In another embodiment, a filter media comprises a first fiber web comprising first fibers having an average diameter of less than or equal to about 0.5 microns and a thickness of less than or equal to about 200 microns; a calendered fiber web directly adjacent to the first fiber web; and a third fiber web bonded to the first fiber web, wherein the filter media has a maximum pore size of greater than or equal to about 0.1 microns and less than or equal to about 2.5 microns and a ratio of maximum pore size to mean pore size of less than or equal to about 5.0.

In one embodiment, a filter media comprises a first fiber web comprising first fibers having an average diameter of less than or equal to about 0.5 microns and a thickness of less than or equal to about 200 microns; a second fiber web directly adjacent to the first fiber web, wherein the second fiber web has a dry tensile strength in the machine direction of greater than or equal to about 1 lb/in and less than or equal to about 35 lb/in, a dry tensile elongation in the machine direction of greater than or equal to about 10% and less than or equal to about 60%, and a mean pore size of greater than or equal to about 1 micron and less than or equal to about 30 microns; and a third fiber web bonded to the first fiber web, wherein the filter media has a maximum pore size of greater than or equal to about 0.1 microns and less than or equal to about 2.5 microns, and a full width at half maximum of a pore size distribution of less than or equal to about 0.2 microns.

In another embodiment, a filter media comprises a first fiber web comprising first fibers having an average diameter of less than or equal to about 0.5 microns and a thickness of less than or equal to about 200 microns; a second fiber web directly adjacent to the first fiber web, wherein the second fiber web has a surface mean pore area of greater than or equal to about 2 $\mu m^2$ and less than or equal to about 50 $\mu m^2$, an intersection density of greater than or equal to about 0.005 intersections/$\mu m^2$ and less than or equal to about 0.025 intersections/$\mu m^2$, and a mean pore size of greater than or equal to about 1 micron and less than or equal to about 30 microns; and a third fiber web bonded to the first fiber web, wherein the filter media has a maximum pore size of greater than or equal to about 0.1 microns and less than or equal to about 2.5 microns, and a full width at half maximum of a pore size distribution of less than or equal to about 0.2 microns.

In another set of embodiments, methods of forming a filter media are provided. In one embodiment, a method of forming a filter media comprises bonding a layer to at least a portion of a surface of a first fiber web to form a filter media, wherein the first fiber web has a maximum pore size of greater than or equal to about 0.1 microns and less than or equal to about 2.5 micron and a ratio of maximum pore size to mean pore size of less than or equal to about 5.0, wherein the first fiber web is directly adjacent to a second fiber web, and wherein the maximum pore size of the filter media is within about 0% to 100% of the maximum pore size of first fiber web prior to the bonding step.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
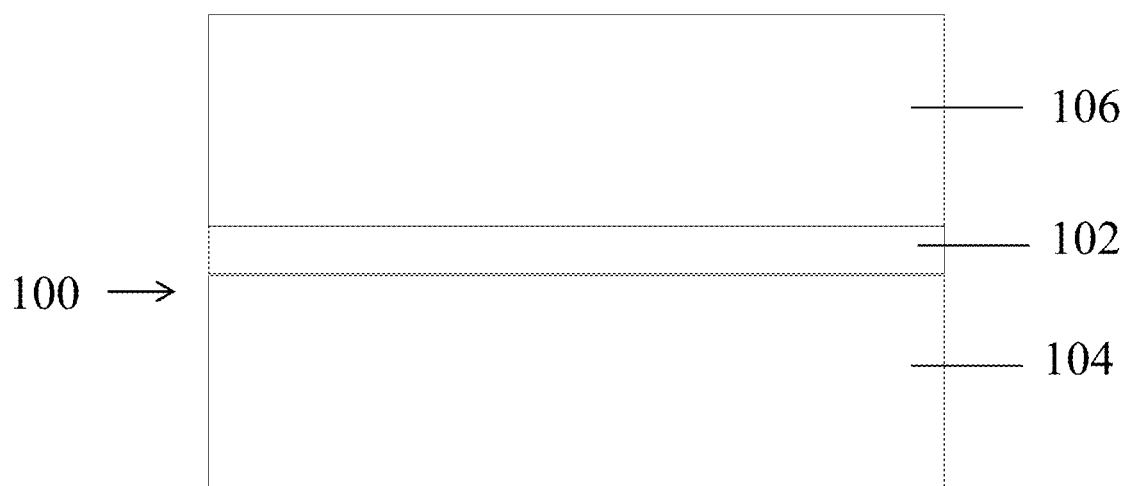
FIG. 1A shows a cross-section of a filter media according to certain embodiments.

Filter media having a relatively small pore size and related components, systems, and methods associated therewith are provided. The filter media may include a fibrous efficiency layer, a fibrous support layer, and a third layer adjacent to the efficiency layer. The efficiency layer may impart a relatively homogeneous pore structure (e.g., narrow pore size distribution, low maximum pore size to mean pore size ratio) to the filter media without adding substantial bulk (e.g., thickness, basis weight) to the filter media. The support layer may promote the homogeneity of the pore structure. For example, the support layer may prevent and/or minimize defects in the relatively thin efficiency layer that may result from manufacturing (e.g., of the efficiency layer) and/or processing (e.g., bonding, winding, pleating, slitting). The third layer may serve to impart beneficial filtration (e.g., efficiency, dust holding capacity) and/or non-filtration (e.g., layer protection) properties to the filter media without adversely affecting one or more properties of the filter media. Filter media, as described herein, may be particularly well-suited for applications that involve liquid filtration, including microfiltration and ultrafiltration in sterile environments, though the media may also be used in other applications, such as microfiltration and ultrafiltration for the oil and gas, process water, wastewater, municipal, semiconductor, food, desalination, and chemical industries.

Filter media including a low basis weight and/or thin efficiency layer with a relatively small and homogeneous pore structure may be advantageous in many applications. Such filter media may have pore characteristics that efficiently capture small particles (e.g., colloidal aggregates, suspended organic and inorganic matter) while allowing fluid to pass through with relative ease. The low thickness and/or basis weight of the efficiency layer may reduce the impact of the tight pore structure on pressure drop, allowing, at least in part, the filter media to have a relatively low pressure drop. The low pressure drop may result in improved energy efficiency, relatively long lifetime, and/or reduced likelihood of damage to the filter media during operation. In addition, the thinness of the efficiency layer, and accordingly the filter media, may allow more filter media to fit into a standard filter element resulting in an increased effective filter area compared to thicker filter media. In some instances, the relatively small and homogeneous pore structure may be formed using fibers having relatively small diameters (e.g., less than or equal to about 0.5 microns). The relatively small diameter fibers and uniformity of fiber diameter (e.g. coefficient of variation around 30%) may impart a relatively higher surface area to the efficiency layer, resulting in a greater particulate capturing efficiency for a given basis weight. Without being bound by theory, it is believed that fine fibers facilitates a smaller pore size in an efficiency layer, and uniformity in fiber size facilitates a narrow pore size distribution. Further, without being bound by theory, the absence or minimization of fiber merging and bundling is conducive to the formation of smaller pores.

However, low basis weight and/or thin efficiency layers may be mechanically fragile. In some cases, the smaller the basis weight, thickness, and/or fiber diameter of the efficiency layer, the lower the strength of the efficiency layer. The fragile nature of the efficiency layer tends to result in defects that adversely affect the homogeneity of the pore structure. These defects can occur, e.g., during formation of the efficiency layer or later on in the filter media or filter element manufacturing process. As a result, low basis weight and/or thin efficiency layers in conventional filter media may display significant variation in the pore sizes across the area of the filter media that may significantly reduce the filtration efficiency of the filter media. Accordingly, some conventional filter media utilize thicker efficiency layers, which produce thicker filter media. The thicker efficiency layers may suffer from a relatively high pressure drop, short lifetime, reduced energy efficiency, and/or reduced effective filter area. There is a need for filter media including a low basis weight and/or thin efficiency layer with a relatively stable, small, and homogeneous pore structure The filter media, described herein, includes a low basis weight and/or thin efficiency layer that does not suffer from one or more limitations of conventional filter media. In some embodiments, as described in more detail below, the filter media includes a fibrous support layer having one or more properties that serve to promote the formation of and/or protect the integrity of fiber webs having relatively small pore sizes and/or homogeneous pore structures. For instance, the fibrous support layer may have surface properties (e.g., pore size, solidity, smoothness, fiber intersection density, surface mean pore area) that facilitate efficiency layer (e.g., fiber web having an average fiber diameter of less than or equal to about 0.5 microns) formation without significant deformation of the deposited efficiency layer within the pore area of the fibrous support layer, and/or may have mechanical properties (e.g., tensile strength, tensile elongation) that sharply reduce the amount of stress imparted to the efficiency layer, e.g., during manufacture, handling, and/or application. For example, without being bound by theory, it is believed that a support layer having a small surface pore area and/or a relatively smooth surface can minimize the average bridge length (e.g., length of fiber between two solid portions of the support layer that is not in direct contact with a solid portion of the support layer) of the fibers in the efficiency layer. In certain embodiments, the support may prevent defects during the filter media and/or filter element manufacturing process. For example, the support layer may prevent defect formation during manufacturing steps, such as during bonding (e.g., adhesively, via lamination) of the efficiency layer to another layer (e.g., fiber web, third layer). Without being bound by theory, it is believed that dimensional stability of the support layer reduces the amount of strain of the nanofiber web during processing and handling steps. Calendering may increase the solidity and/or the dimensional stability (e.g. increased strength, increased toughness, increased compressive modulus) of a fiber web (e.g., polymer fiber web) to be used for, e.g., a support layer. Without being bound by theory, it is believed that calendering can increase the amount of bonding between individual fibers in the fiber web (e.g., polymer web) and also increase the amount of crystallinity of the polymer in embodiments where the fiber web comprises polymer fibers, both of which may result in higher strength and toughness.

Regardless of whether defect formation is prevented or otherwise minimized during the web formation and/or subsequent manufacturing steps, a low basis weight and/or thin efficiency layer adjacent to (e.g., directly adjacent to) the support layer described herein may have a relatively small and homogeneous pore structure when incorporated into a filter media and/or filter element. For instance, a support layer, described herein, directly adjacent to a low basis weight and/or thin efficiency layer comprising relatively small fibers (e.g., average diameter of less than or equal to about 0.5 microns) allows the efficiency layer or a plurality of such efficiency layers to withstand processing conditions that would otherwise typically result in increased pore size and/or defects (e.g., fiber web formation, bonding with other layers, tension from rollers). As an example, a fibrous efficiency layer directly adjacent to the support layer may substantially retain the pore structure when bonded to a third layer (e.g., protective layer) using lamination (e.g., heat lamination) or an adhesive (e.g., an acrylic adhesive, an acrylic copolymer adhesive) whereas a similar process using a conventional support layer may result in a significant change in pore structure. In some embodiments, filter media described herein are substantially free of an adhesive. In some embodiments, filter media described herein have no adhesive.

Filter media described herein may be used in a variety of applications (e.g., liquid filtration; e.g., removal of fine small particulates and dust when filtering microelectronic fluids, paints, solvents, other chemicals, water, food or biopharmaceutical suspensions).

Figure 1B:
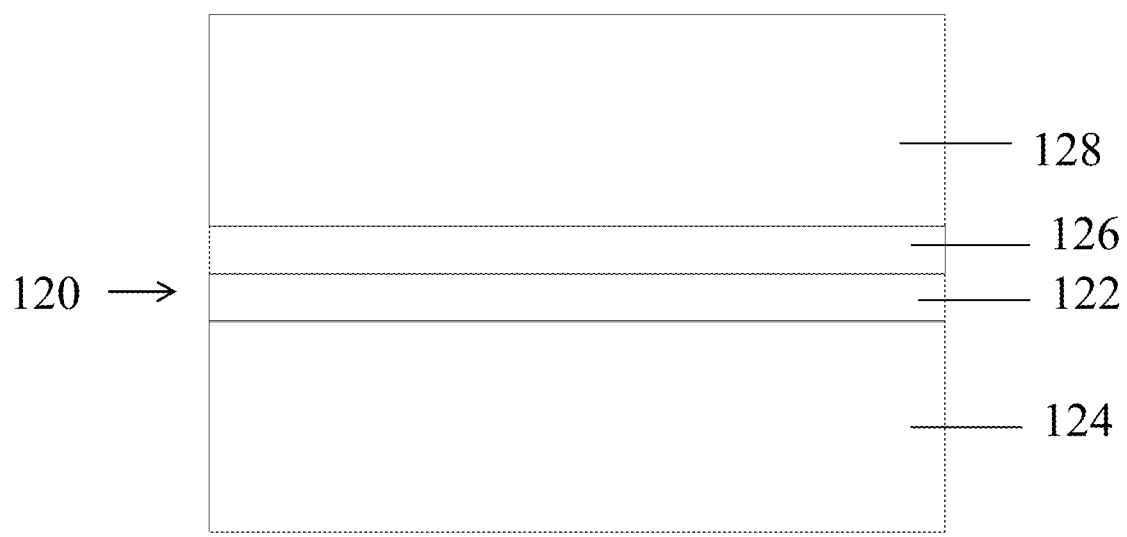
FIG. 1B shows a cross-section of a filter media according to certain embodiments.
Figure 1C:
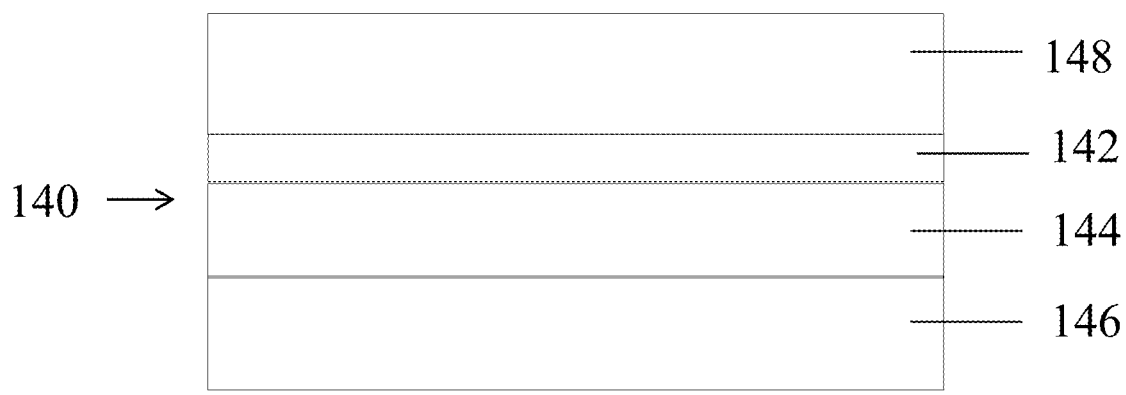
FIG. 1C shows a cross-section of a filter media according to certain embodiments.

Non-limiting examples of filter media described herein are shown in FIGS. 1A-C. In some embodiments, as illustrated in FIG. 1A, a filter media 100 may comprise a first fiber web 102. Fiber web 102 may be a fibrous efficiency layer having a relatively small and homogeneous pore structure. For instance, fiber web 102 may have a relatively small maximum pore size (e.g., less than or equal to about 2.5 microns, less than or equal to about 1.5 microns, less than or equal to about 1.0 microns) and/or mean flow pore size (e.g., less than or equal to about 1.0 micron, less than or equal to about 0.4 microns). In some instances, the ratio of maximum pore size to mean pore size of the first fiber web may be less than or equal to about 5 (e.g., less than or equal to about 2.7). Fiber web 102 may have a relatively narrow pore size distribution. For instance, the first fiber web may have a full width at half maximum of a pore size distribution of less than or equal to about 0.2 microns (e.g., less than or equal to about 0.1 microns).

Fiber web 102 may be relatively thin and/or lightweight. For instance, the first fiber web may have a thickness less than or equal to about 200 microns (e.g., less than or equal to about 20 microns). In some cases, the first fiber web may have a basis weight of less than or equal to about 10 g/m² (e.g., less than or equal to about 5.0 g/m², less than or equal to about 2.0 g/m²). In some embodiments, the first fiber web may comprise fibers having a relatively small diameter. For example, fiber web 102 may comprise fibers having an average diameter of less than or equal to about 0.5 microns (e.g., less than or equal to about 0.2 microns). In some such cases, first fiber web 102 may comprise continuous fibers (e.g., electrospun fibers) having an average diameter of less than or equal to about 0.5 microns.

Filter media 100 may also comprise a support layer. The support layer may comprise a second fiber web 104 adjacent to first fiber web 102. In some such embodiments, first fiber web 102 may be formed onto second fiber web 104. The second fiber web 104 may have one or more surface and/or mechanical properties that promote the homogeneity of the pore structure of first fiber web 102. For instance, the surface mean pore area of second fiber web 104 may be less than or equal to about 50 μm² (e.g., less than or equal to about 25 μm²). As used herein, the term "surface mean pore area" refers to an average pore cross-sectional area at a surface of a layer, e.g., comprising a fiber web. This surface mean pore area may be determined by analyzing a scanning electron microscopy (SEM) image as described further herein. The root mean square surface roughness of the second fiber web 104 may be less than or equal to 12 μm (e.g., less than or equal to 6 μm). In some instances, second fiber web 104 may have a tensile strength of less than or equal to about 35 lb/in (e.g., less than or equal to about 30 lb/in) in the machine direction and/or a tensile elongation of greater than or equal to about 10% and less than or equal to about 60% in the machine direction. In some instances, second fiber web 104 serves to promote and/or otherwise maintain the homogeneity of first fiber web 102 by decreasing the stress on the first fiber web 102 during fabrication and/or use of the filter media 100. In some embodiments, third fiber web 106 is a meltblown layer. In some embodiments, third fiber web 106 has an average fiber diameter greater than that of the first fiber web 102 and less than that of the second fiber web 104.

In some embodiments, calendering (e.g., smooth roll calendering) may be used to impart one or more beneficial surface and/or mechanical properties to the second fiber web. For instance, calendering may increase the smoothness, strength, and/or solidity of the second fiber web while decreasing the surface mean pore area, the amount of surface protruding fibers, and/or the amount of loose fibers on the surface of the support layer. The second fiber web may be calendered prior to contact with the first fiber web. In some such cases, filter media 100 comprises a first fiber web that is not calendered and a calendered second fiber web. In some embodiments, one or more beneficial surface and/or mechanical properties may be imparted to the second fiber web via a non-calendering process. For example, fiber selection may be used to impart beneficial properties to the second fiber web. In certain embodiments, second fiber web 104 may comprise continuous fibers (e.g., meltblown fibers). In certain embodiments, second fiber web 104 may be a wetlaid or non-wet laid fiber web comprising staple fibers (e.g. Cyphrex fibers, Lyocell fibers, glass fibers, fibrillated fibers) having a relatively small diameter and/or a relatively small length, which may decrease the pore size of the second fiber web, and staple fibers having a relatively large diameter.

Filter media 100 may further comprise a third fiber web 106. The third fiber web 106 may be configured to impart beneficial properties (e.g., dirt holding capacity, abrasion protection) to the filter media while having relatively minimal or no adverse effects on one or more properties of the filter media that are important for a given application. In some embodiments, the third fiber web serves as a protective and/or capacity layer (e.g., pre-filter layer). For instance, the third fiber web may serve to capture and retain particulates (e.g., coarse particles) during filtration thereby enhancing the dirt holding capacity of the filter media and/or prevent abrasive damage and other contact induced damage to one or more layers (e.g., efficiency layer) of the filter media. In other embodiments, the third fiber web may be an efficiency layer. In some such embodiments, the third fiber web may have one or more properties (e.g., pore size, basis weight, thickness) that is/are substantially similar to and/or the same as a property of the first fiber web.

Regardless of the function of the third fiber web, third fiber web 106 may be bonded to first fiber web 102. In some embodiments, the third fiber web may be bonded to the first fiber web via a lamination process (e.g., heat lamination). In certain embodiments, the third fiber web may be adhesively bonded to the first fiber web. It should be understood that in some conventional filter media, the bonding process between the efficiency layer and another layer may damage the structure of the efficiency layer in a manner that increases the maximum pore size (e.g., due to defect formation) and/or pore distribution. However, an efficiency layer (e.g., first fiber web) adjacent to the support layer (e.g., second fiber web) described herein does not experience the damage typical of conventional filter media. Additionally, the third fiber web can act as a pre-filter to the efficiency layer resulting in higher operation life-time of the efficiency layer. In some embodiments, the third fiber web has a maximum pore size below 70 microns; a solidity between 5% and 50%; and/or a basis weight between 5 g/m² and 50 g/m².

In some embodiments, the filter media may comprise one or more additional layers as illustrated in FIGS. 1B-1C. For instance, as illustrated in FIG. 1B, a filter media 120 may include a first fiber web 122 (e.g., efficiency layer), a second fiber web 124 (e.g., support layer), a third fiber web 126, and a fourth fiber web 128. In certain embodiments, third fiber web 126 may be part of the efficiency layer. That is, the efficiency layer may comprise first fiber web 122 and third fiber web 126. In such cases, fourth fiber web 128 may be a protective layer. In some such cases, fourth fiber web 128 may be adjacent (e.g., directly) to third fiber web 126. Third fiber web 126 may be bonded (e.g., directly) to first fiber web 122 and fiber web 122 may be adjacent to second fiber web 124 as illustrated in FIG. 1B. In some embodiments, third fiber web 126 is a meltblown layer. In some embodiments, third fiber web 126 has an average fiber diameter greater than that of the first fiber web 122 and less than that of the fourth fiber web 128. In some embodiments, third fiber web 126 has an average fiber diameter less than that of the second fiber web 124.

In other embodiments, the fourth fiber web may not be adjacent (e.g., directly) to the third fiber web. For instance, as illustrated in FIG. 1C, a filter media 140 may include a fourth fiber web 146 adjacent (e.g., directly) to a second fiber web 144. In some such cases, second fiber web 144 and fourth fiber web 146 may be part of the support layer. That is, the support layer may comprise second fiber web 144 and fourth fiber web 146. In some cases, second fiber web 144 may have one or more properties that promote the homogeneity of the first fiber web (e.g., efficiency layer) and/or fourth fiber web 146 may provide beneficial mechanical properties to the filter media. First fiber web 142 may be adjacent (e.g., directly) to and/or bonded to third fiber web 148.

In some embodiments, all layers (e.g., fiber webs) in the filter media (e.g., filter media 100, filter media 120, filter media 140) are non-wet laid.

As used herein, when a fiber web is referred to as being "adjacent" another fiber web, it can be directly adjacent the fiber web, or an intervening fiber web also may be present. A fiber web that is "directly adjacent" another fiber web means that no intervening fiber web is present.

In general, the one or more additional fiber webs may be any suitable fiber web (e.g., a scrim fiber web, a backer fiber web, a substrate fiber web, an efficiency fiber web, a capacity fiber web, a spacer fiber web, a support fiber web).

In some embodiments, one or more fiber webs in the filter media may be designed to be discrete from another fiber web. That is, the fibers from one fiber web do not substantially intermingle (e.g., do not intermingle at all) with fibers from another fiber web. For example, with respect to FIG. 1, in one set of embodiments, fibers from the first fiber web do not substantially intermingle with fibers of the second fiber web. Discrete fiber webs may be joined by any suitable process including, for example, lamination, thermo-dot bonding, calendering, through-gas bonding, ultrasonic processes, chemical bonding process (e.g., to form covalent bonds), or by adhesives, as described in more detail below. It should be appreciated, however, that certain embodiments may include one or more fiber webs that are not discrete with respect to one another.

It should be understood that the configurations of the fiber webs shown in the figures are by way of example only, and that in other embodiments, filter media including other configurations of fiber webs may be possible. For example, while the first, second, and optional fiber webs are shown in a specific order in FIG. 1, other configurations are also possible. For example, an optional fiber web may be positioned between the first and second fiber webs. It should be appreciated that the terms "first", and "second" fiber webs, as used herein, refer to different fiber webs within the media, and are not meant to be limiting with respect to the location of that fiber web. Furthermore, in some embodiments, additional fiber webs (e.g., "third", "fourth", "fifth", "sixth", or "seventh" fiber webs) may be present in addition to the ones shown in the figures. It should also be appreciated that not all fiber webs shown in the figures need be present in some embodiments.

As noted above, filter media, described herein, may comprise a first fiber web (e.g., efficiency layer) having a relatively small and homogeneous pore structure. In some embodiments, the maximum pore size of the first fiber web may be relatively small. For instance, in some embodiments, the first fiber web may have a maximum pore size of less than or equal to about 2.5 microns, less than or equal to about 2.3 microns, less than or equal to about 2.0 microns, less than or equal to about 1.8 microns, less than or equal to about 1.5 microns, less than or equal to about 1.4 microns, less than or equal to about 1.3 microns, less than or equal to about 1.2 microns, less than or equal to about 1.1 microns, less than or equal to about 1.0 micron, less than or equal to about 0.9 microns, less than or equal to about 0.8 microns, less than or equal to about 0.7 microns, less than or equal to about 0.6 microns, less than or equal to about 0.5 microns, less than or equal to about 0.4 microns, less than or equal to about 0.3 microns, or less than or equal to about 0.2 microns. In some instances, the first fiber web may have a maximum pore size of greater than or equal to about 0.1 microns, greater than or equal to about 0.2 microns, greater than or equal to about 0.3 microns, greater than or equal to about 0.4 microns, greater than or equal to about 0.5 microns, greater than or equal to about 0.6 microns, greater than or equal to about 0.7 microns, greater than or equal to about 0.8 microns, greater than or equal to about 0.9 microns, greater than or equal to about 1.0 micron, greater than or equal to about 1.1 microns, greater than or equal to about 1.2 microns, greater than or equal to about 1.4 microns, greater than or equal to about 1.6 microns, greater than or equal to about 1.8 microns, greater than or equal to about 2.0 microns, or greater than or equal to about 2.2 microns. Combinations of the above-referenced ranges are also possible (e.g., greater than or equal to about 0.1 microns and less than or equal to about 2.5 microns, greater than or equal to about 0.5 microns and less than or equal to about 1.5 microns). Other values of maximum pore size are also possible. The maximum pore size may be determined via bubble point measurement according to the standard ASTM F-316-80 Method B, BS6410 (2011), e.g., using a Capillary Flow Porometer (e.g., model number CFP-34RTF-8A-X6) made by Porous Materials Inc. and Galwick, which has a fluid surface tension of 15.9 dynes/cm.

In some embodiments, the mean flow pore size of the first fiber web may be less than or equal to about 1.0 micron, less than or equal to about 0.9 microns, less than or equal to about 0.8 microns, less than or equal to about 0.7 microns, less than or equal to about 0.6 microns, less than or equal to about 0.5 microns, less than or equal to about 0.4 microns, less than or equal to about 0.3 microns, less than or equal to about 0.1 microns, or less than or equal to about 0.08 microns. In some instances, the mean flow pore size may be greater than or equal to about 0.05 microns, greater than or equal to about 0.06 microns, greater than or equal to about 0.07 microns, greater than or equal to about 0.08 microns, greater than or equal to about 0.1 microns, greater than or equal to about 0.2 microns, greater than or equal to about 0.3 microns, greater than or equal to about 0.4 microns, greater than or equal to about 0.5 microns, greater than or equal to about 0.6 microns, greater than or equal to about 0.7 microns, greater than or equal to about 0.8 microns, or greater than or equal to about 0.9 microns. Combinations of the above-referenced ranges are also possible (e.g., greater than or equal to about 0.05 microns and less than or equal to about 1 micron, greater than or equal to about 0.1 microns and less than or equal to about 0.4 microns). The mean flow pore size may be determined according to the standard ASTM F-316-80 Method B, BS6410 (2011), e.g., using a Capillary Flow Porometer (e.g., model number CFP-34RTF-8A-X6) made by Porous Materials Inc. and Galwick, which has a fluid surface tension of 15.9 dynes/cm.

In some embodiments, the pore characteristics of the first fiber web may be relatively homogenous. For instance, in some embodiments, the ratio of maximum pore size to mean flow pore size of the first fiber web may be less than or equal to about 5.0, less than or equal to about 4.8, less than or equal to about 4.5, less than or equal to about 4.2, less than or equal to about 4.0, less than or equal to about 3.8, less than or equal to about 3.5, less than or equal to about 3.2, less than or equal to about 3.0, less than or equal to about 2.7, less than or equal to about 2.5, less than or equal to about 2.2, less than or equal to about 2.0, less than or equal to about 1.8, less than or equal to about 1.5, or less than or equal to about 1.2. In some instances, the ratio of maximum pore size to mean flow pore size may be greater than or equal to about 1, greater than or equal to about 1.2, greater than or equal to about 1.5, greater than or equal to about 1.8, greater than or equal to about 2.0, greater than or equal to about 2.3, greater than or equal to about 2.5, greater than or equal to about 2.8, greater than or equal to about 3.0, greater than or equal to about 3.2, greater than or equal to about 3.5, greater than or equal to about 3.8, greater than or equal to about 4.0, greater than or equal to about 4.2, greater than or equal to about 4.5, or greater than or equal to about 4.8. Combinations of the above-referenced ranges are also possible (e.g., greater than or equal to about 1.0 and less than or equal to about 5.0, greater than or equal to about 2.3 and less than or equal to about 2.7). The ratio may be determined according to the standard ASTM F316-03 Method B, BS6410 (2011) as described above.

As described in more detail below, the first fiber web may comprise synthetic fibers (e.g., nylon fibers), amongst other fiber types. In some instances, the first fiber web may comprise a relatively high weight percentage of synthetic fibers (e.g., greater than or equal to about 95 wt. %, 100 wt. %). In some instances, the synthetic fibers may be continuous as described further below. For example, the fiber web may comprise a relatively high percentage (e.g., greater than or equal to about 95 wt. %, 100 wt. %) of synthetic fibers formed via an electrospinning process. In general, the first fiber web may comprise synthetic fibers formed by any suitable process including an electrospinning process, melt-blown process, melt spinning process, or centrifugal spinning process. In certain embodiments, the first fiber web may comprise nylon and/or poly(ether sulfone) (PES) fibers. In some embodiments, an electrospinning process facilitates the formation of an efficiency layer with a small mean pore size and a narrow pore size distribution.

In some embodiments, the first fiber web may have an average fiber diameter of less than or equal to about 0.5 microns, less than or equal to about 0.45 microns, less than or equal to about 0.4 microns, less than or equal to about 0.35 microns, less than or equal to about 0.3 microns, less than or equal to about 0.25 microns, less than or equal to about 0.2 microns, less than or equal to about 0.15 microns, less than or equal to about 0.1 microns, less than or equal to about 0.09 microns, less than or equal to about 0.08 microns, less than or equal to about 0.07 microns, or less than or equal to about 0.06 microns. In some instances, the average fiber diameter of the first fiber web may be greater than or equal to about 0.05 microns, greater than or equal to about 0.06 microns, greater than or equal to about 0.07 microns, greater than or equal to about 0.08 microns, greater than or equal to about 0.09 microns, greater than or equal to about 0.1 microns, greater than or equal to about 0.15 microns, greater than or equal to about 0.2 microns, greater than or equal to about 0.25 microns, greater than or equal to about 0.3 microns, greater than or equal to about 0.35 microns, greater than or equal to about 0.4 microns, or greater than or equal to about 0.45 microns. Combinations of the above-referenced ranges are also possible (e.g., greater than or equal to about 0.05 microns and less than or equal to about 0.5 microns, greater than or equal to about 0.07 microns and less than or equal to about 0.2 microns). Other values of average fiber diameter are also possible.

In some embodiments, the first fiber web may be relatively thin. For instance, in some embodiments, the first fiber web may have a thickness of less than or equal to about 200 microns, less than or equal to about 175 microns, less than or equal to about 150 microns, less than or equal to about 125 microns, less than or equal to about 100 microns, less than or equal to about 75 microns, less than or equal to about 50 microns, less than or equal to about 40 microns, less than or equal to about 30 microns, less than or equal to about 20 microns, less than or equal to about 18 microns, less than or equal to about 15 microns, less than or equal to about 12 microns, less than or equal to about 10 microns, or less than or equal to about 8 microns. In some instances, the first fiber web may have a thickness of greater than or equal to about 5 microns, greater than or equal to about 6 microns, greater than or equal to about 8 microns, greater than or equal to about 10 microns, greater than or equal to about 12 microns, greater than or equal to about 15 microns, greater than or equal to about 18 microns, greater than or equal to about 20 microns, greater than or equal to about 25 microns, greater than or equal to about 30 microns, greater than or equal to about 40 microns, greater than or equal to about 50 microns, greater than or equal to about 75 microns, greater than or equal to about 100 microns, greater than or equal to about 125 microns, greater than or equal to about 150 microns, or greater than or equal to about 175 microns. Combinations of the above-referenced ranges are also possible (e.g., greater than or equal to about 5 microns and less than or equal to about 200 microns, greater than or equal to about 5 microns and less than or equal to about 20 microns). Other values of average thickness are also possible. In some embodiments, the thickness is determined using scanning electron microscopy (SEM). Thicknesses of 5 micron or greater may be determined according to the standard ASTM D1777-96 (2015) using a pressure of 2.65 psi. Thicknesses less than 5 micron may be determined using scanning electron microscopy.

In some embodiments, the first fiber web may have a relatively low basis weight. For instance, in some embodiments, the first fiber web may have a basis weight of less than or equal to about 10 $g/m^2$, less than or equal to about 9 $g/m^2$, less than or equal to about 8 $g/m^2$, less than or equal to about 7 $g/m^2$, less than or equal to about 6 $g/m^2$, less than or equal to about 5.0 $g/m^2$, less than or equal to about 4.5 $g/m^2$, less than or equal to about 4.0 $g/m^2$, less than or equal to about 3.5 $g/m^2$, less than or equal to about 3.0 $g/m^2$, less than or equal to about 2.5 $g/m^2$, less than or equal to about 2.0 $g/m^2$, less than or equal to about 1.5 $g/m^2$, less than or equal to about 1.0 $g/m^2$, or less than or equal to about 0.8 $g/m^2$. In some instances, the first fiber web may have a basis weight of greater than or equal to about 0.5 $g/m^2$, greater than or equal to about 1 $g/m^2$, greater than or equal to about 1.5 $g/m^2$, greater than or equal to about 2.0 $g/m^2$, greater than or equal to about 2.5 $g/m^2$, greater than or equal to about 3.0 $g/m^2$, greater than or equal to about 3.5 $g/m^2$, greater than or equal to about 4.0 $g/m^2$, greater than or equal to about 5.0 $g/m^2$, greater than or equal to about 6 $g/m^2$, greater than or equal to about 7 $g/m^2$, or greater than or equal to about 8 $g/m^2$. Combinations of the above-referenced ranges are possible (e.g., greater than or equal to about 0.5 $g/m^2$ and less than or equal to about 10 $g/m^2$, greater than or equal to about 0.5 $g/m^2$ and less than or equal to about 5.0 $g/m^2$, greater than or equal to about 1.0 $g/m^2$ and less than or equal to about 2.0 $g/m^2$). Other values of basis weight are possible. The basis weight may be determined according to the standard ASTM D3776-09 (2009).

In certain embodiments, the first fiber web, described herein, may have a relatively low solidity. For instance, in some embodiments, the first fiber web may have a solidity of less than or equal to about 30%, less than or equal to about 28%, less than or equal to about 25%, less than or equal to about 22%, less than or equal to about 20%, less than or equal to about 18%, less than or equal to about 15%, less than or equal to about 12%, less than or equal to about 10%, less than or equal to about 8%, or less than or equal to about 5%. In some instances, the first fiber web may have a solidity of greater than or equal to about 2%, greater than or equal to about 5%, greater than or equal to about 8%, greater than or equal to about 10%, greater than or equal to about 12%, greater than or equal to about 15%, greater than or equal to about 20%, greater than or equal to about 22%, greater than or equal to about 25%, or greater than or equal to about 28%. It should be understood that combinations of the above-reference ranges are possible (e.g., greater than or equal to about 2% and less than or equal to about 30%, greater than or equal to about 5% and less than or equal to about 12%). The solidity is the volume percentage of a layer (e.g., fiber web) or a filter media occupied by solids (e.g., fibers) and is therefore the 100 times ratio of the solids volume per unit mass divided by the volume per unit mass of the layer or media. The solidity, expressed as a percentage, can be derived from the fiber web porosity based on the following equation: solidity (%)=100−porosity (%). Solidity, as used herein, may also be determined by using the following formula: solidity (%)=[basis weight/(fiber density*thickness)]*100. The basis weight and thickness may be determined as described herein. In some embodiments, fiber density is equal to the density of the material (e.g., polymer) of which the fiber(s) are made. For example, fiber density of polyamide 6 fibers may be equal to the density of polyamide 6 (around 1.14 g/cc; cc=$cm^3$).

In certain embodiments, the first fiber web, described herein, may have a relatively high surface area. For instance, in some embodiments, the first fiber web may have a surface area of greater than or equal to about 5 $m^2/g$, greater than or equal to about 10 $m^2/g$, greater than or equal to about 25 $m^2/g$, greater than or equal to about 50 $m^2/g$, greater than or equal to about 75 $m^2/g$, greater than or equal to about 100 $m^2/g$, greater than or equal to about 125 $m^2/g$, greater than or equal to about 150 $m^2/g$, greater than or equal to about 175 $m^2/g$, greater than or equal to about 200 $m^2/g$, greater than or equal to about 225 $m^2/g$, greater than or equal to about 250 $m^2/g$, greater than or equal to about 275 $m^2/g$, or greater than or equal to about 300 $m^2/g$. In some instances, the first fiber web may have a surface area of less than or equal to about 350 $m^2/g$, less than or equal to about 325 $m^2/g$, less than or equal to about 300 $m^2/g$, less than or equal to about 275 $m^2/g$, less than or equal to about 250 $m^2/g$, less than or equal to about 225 $m^2/g$, less than or equal to about 200 $m^2/g$, less than or equal to about 175 $m^2/g$, less than or equal to about 150 $m^2/g$, less than or equal to about 125 $m^2/g$, less than or equal to about 100 $m^2/g$, less than or equal to about 70 $m^2/g$, less than or equal to about 40 $m^2/g$, or less than or equal to about 10 $m^2/g$. It should be understood that combinations of the above-referenced ranges are possible (e.g., greater than or equal to about 5 $m^2/g$ and less than or equal to about 350 $m^2/g$, greater than or equal to about 5 $m^2/g$ and less than or equal to about 70 $m^2/g$, greater than or equal to about 5 $m^2/g$ and less than or equal to about 75 $m^2/g$).

As determined herein, surface area is measured through use of a standard BET surface area measurement technique. The BET surface area is measured according to section 10 of Battery Council International Standard BCIS-03A, "Recommended Battery Materials Specifications Valve Regulated Recombinant Batteries", section 10 being "Standard Test Method for Surface Area of Recombinant Battery Separator Mat". Following this technique, the BET surface area is measured via adsorption analysis using a BET surface analyzer (e.g., Micromeritics Gemini III 2375 Surface Area Analyzer) with nitrogen gas; the sample amount is between 0.5 and 0.6 grams in, e.g., a ¾" tube; and, the sample is allowed to degas at 75 degrees C. for a minimum of 3 hours.

As described herein, the filter media may comprise a second fiber web (e.g., calendered fiber web). In some embodiments, one or more properties of the second fiber web may impart beneficial properties to the filter media, such as relatively homogeneous pore characteristics and mechanical stability. For instance, certain pore characteristics (e.g., solidity, surface mean pore area, intersection density (number of intersections per unit area), pore size), certain mechanical properties (e.g., tensile strength, tensile elongation), and/or the smoothness of the second fiber web may serve to promote relative pore homogeneity and/or provide mechanical stability for one or more fiber webs (e.g., first fiber web). In some embodiments, a second fiber web with the above-mentioned beneficial properties may be formed using a calendering process. In some such cases, the second fiber web may be calendered prior to combination with another fiber web (e.g., first fiber web) in the filter media and/or inclusion into the filter media. In other embodiments, a second fiber web with the above-mentioned beneficial properties may be formed by casting a cross-linkable monomer solution (e.g., acrylate, acrylamide or cellulose monomers) on to a non-compressed fiber web (e.g., meltblown fiber web), such that the cross-linkable monomer solution fully wets the pores of the non-compressed fiber web (e.g., meltblown fiber web). In some such embodiments, crosslinking and polymerization of the monomer leads to pore filling and strengthening of the fiber web. In some such embodiments, crosslinking can be initiated via irradiation, or a chemical process or a thermal treatment. The crosslinked or polymerized monomer may be a sacrificial layer that is removed after deposition of the first fiber web (e.g., efficiency layer).

In some embodiments, the distance between fibers in the second layer may be relatively small. Without being bound by theory, it is believed that fibers of the first fiber web are more likely to uniformly cover porous areas of the second fiber web (e.g., without defect and crack formation) when the distance between fibers in the second layer is small.

In some embodiments, the porosity of the second fiber web may be greater than or equal to about 35%, greater than or equal to about 40%, greater than or equal to about 45%, greater than or equal to about 50%, greater than or equal to about 55%, greater than or equal to about 60%, greater than or equal to about 65%, greater than or equal to about 70%, or greater than or equal to about 75%. In some instances, the porosity of the second fiber web may less than or equal to about 80%, less than or equal to about 75%, less than or equal to about 70%, less than or equal to about 65%, less than or equal to about 60%, or less than or equal to about 55%. It should be understood that combinations of the above-referenced ranges are possible (e.g., greater than or equal to about 50% and less than or equal to about 90%, greater than or equal to about 70% and less than or equal to about 90%). In some embodiments, the porosity of the second fiber web is greater than or equal to about 35% and less than or equal to about 80%. The porosity of a fiber web, porosity (%)=100−solidity (%).

In certain embodiments, the second fiber web, described herein, may have a relatively small surface mean pore area. For instance, in some embodiments, the second fiber web may have a surface mean pore area of less than or equal to about 50 $\mu m^2$, less than or equal to about 45 $\mu m^2$, less than or equal to about 40 $\mu m^2$, less than or equal to about 35 $\mu m^2$, less than or equal to about 30 $\mu m^2$, less than or equal to about 25 $\mu m^2$, less than or equal to about 20 $\mu m^2$, less than or equal to about 15 $\mu m^2$, less than or equal to about 10 $\mu m^2$, or less than or equal to about 5 $\mu m^2$. In some instances, the second fiber web may have a surface mean pore area of greater than or equal to about 2 $\mu m^2$, greater than or equal to about 5 $\mu m^2$, greater than or equal to about 8 $\mu m^2$, greater than or equal to about 10 $\mu m^2$, greater than or equal to about 15 $\mu m^2$, greater than or equal to about 20 $\mu m^2$, greater than or equal to about 25 $\mu m^2$, greater than or equal to about 30 $\mu m^2$, greater than or equal to about 35 $\mu m^2$, greater than or equal to about 40 $\mu m^2$, greater than or equal to about 45 $\mu m^2$, or greater than or equal to about 50 $\mu m^2$. It should be understood that combinations of the above-reference ranges are possible (e.g., greater than or equal to about 2 $\mu m^2$ and less than or equal to about 50 $\mu m^2$, greater than or equal to about 5 $\mu m^2$ and less than or equal to about 25 $\mu m^2$). Other values of surface mean pore area of the second fiber web are also possible.

As determined herein, the surface mean pore area is measured through scanning electron microscopy analysis using DiameterJ, a plug-in for the ImageJ image analysis software. A Phenom desktop scanning electron microscope can be used to generate the micrographs. The microscope may be focused on a surface of a layer (e.g., a fiber web; e.g., a second fiber web), e.g., at a zero degrees tilt. The micrographs can be taken at a magnification of 1200×. The electron acceleration voltage can be 10 kV and backscattered electrons can be used to create the micrographs. The SEM micrographs (images) can be in gray scale. To measure geometrical characteristics of an SEM image (e.g., average fiber diameter, surface mean pore area, average fiber intersection density), ImageJ software can transform the SEM image from gray scale to black-and-white image. In a black-and-white image, a black pixel can represent at least a portion of a pore (e.g., hole) and a white pixel can represent at least a portion of a solid material (e.g., fiber). In a continuous web such as a meltblown fiber web, collections of one or more black pixels, also referred to as black "islands," may be surrounded by white pixels. A software algorithm in ImageJ can detect these black "islands", count the number of black islands (the number of pores) and measure the area of each of them (the surface cross-sectional area of each pore, or pore area). The surface mean pore area can be calculated by dividing the cumulative pore area of all pores in an SEM image by the number of pores in the image. Similarly, the software can count the number of white pixels and calculate fiber diameter, intersection density, and/or other information.

In certain embodiments, the second fiber web, described herein, may have a relatively high number of fiber intersections per unit area. For instance, in some embodiments, the second fiber web may have greater than or equal to about 0.005 intersections/$\mu m^2$, greater than or equal to about 0.006 intersections/$\mu m^2$, greater than or equal to about 0.007 intersections/$\mu m^2$, greater than or equal to about 0.008 intersections/$\mu m^2$, greater than or equal to about 0.009 intersections/$\mu m^2$, greater than or equal to about 0.01 intersections/$\mu m^2$, greater than or equal to about 0.012 intersections/$\mu m^2$, greater than or equal to about 0.015 intersections/$\mu m^2$, greater than or equal to about 0.018 intersections/$\mu m^2$, or greater than or equal to about 0.02 intersections/$\mu m^2$. In some instances, the second fiber web may have less than or equal to about 0.025 intersections/$\mu m^2$, less than or equal to about 0.022 intersections/$\mu m^2$, less than or equal to about 0.2 intersections/$\mu m^2$, less than or equal to about 0.018 intersections/$\mu m^2$, less than or equal to about 0.015 intersections/$\mu m^2$, less than or equal to about 0.012 intersections/$\mu m^2$, less than or equal to about 0.01 intersections/$\mu m^2$, less than or equal to about 0.009 intersections/$\mu m^2$, less than or equal to about 0.008 intersections/$\mu m^2$, less than or equal to about 0.007 intersections/$\mu m^2$, or less than or equal to about 0.006 intersections/$\mu m^2$. It should be understood that combinations of the above-reference ranges are possible (e.g., greater than or equal to about 0.005 intersections/$\mu m^2$ and less than or equal to about 0.025 intersections/$\mu m^2$, greater than or equal to about 0.008 intersections/$\mu m^2$ and less than or equal to about 0.02 intersections/$\mu m^2$).

As determined herein, the number of fiber intersections per micron squared may be measured through scanning electron microscopy analysis using ImageJ image analysis software. A Phenom desktop scanning electron microscope can be used to generate the micrographs. The microscope may be focused on a surface of a layer (e.g., a fiber web; e.g., a second fiber web), e.g., at a zero degrees tilt. The micrographs can be taken at a magnification of 1200×. The electron acceleration voltage can be 10 kV and backscattered electrons can be used to create the micrographs. The total number of intersections between fibers at the surface of the layer can be determined by counting the intersections in a micrograph and dividing the number of intersections by the area covered by the micrograph.

In some embodiments, the second fiber web may have a maximum pore size of less than or equal to about 80 microns, less than or equal to about 70 microns, less than or equal to about 60 microns, less than or equal to about 50 microns, less than or equal to about 40 microns, less than or equal to about 30 microns, less than or equal to about 20 microns, or less than or equal to about 15 microns. In some instances, the second fiber web may have a maximum pore size of greater than or equal to about 10 microns, greater than or equal to about 20 microns, greater than or equal to about 30 microns, greater than or equal to about 40 microns, greater than or equal to about 50 microns, greater than or equal to about 60 microns, or greater than or equal to about 70 microns. Combinations of the above-referenced ranges are also possible (e.g., greater than or equal to about 10 microns and less than or equal to about 80 microns, greater than or equal to about 30 microns and less than or equal to about 80 microns, greater than or equal to about 70 microns and less than or equal to about 80 microns). Other values of maximum pore size are also possible.

In some embodiments, the mean flow pore size of the second fiber web (e.g., calendered fiber web) may be less than or equal to about 30 microns, less than or equal to about 28 microns, less than or equal to about 25 microns, less than or equal to about 22 microns, less than or equal to about 20 microns, less than or equal to about 18 microns, less than or equal to about 15 microns, less than or equal to about 12 microns, less than or equal to about 10 microns, less than or equal to about 8 microns, less than or equal to about 5 microns, less than or equal to about 4 microns, or less than or equal to about 2 microns. In some instances, the mean flow pore size may be greater than or equal to about 1 micron, greater than or equal to about 2 microns, greater than or equal to about 5 microns, greater than or equal to about 8 microns, greater than or equal to about 10 microns, greater than or equal to about 12 microns, greater than or equal to about 15 microns, greater than or equal to about 20 microns, greater than or equal to about 22 microns, greater than or equal to about 25 microns, or greater than or equal to about 28 microns. Combinations of the above-referenced ranges are also possible (e.g., greater than or equal to about 1 micron and less than or equal to about 30 microns, greater than or equal to about 10 microns and less than or equal to about 20 microns).

As noted above, in some embodiments, the second fiber web may be relatively resistant to deformation without being brittle. For instance, the second fiber web may have a relatively high tensile strength and/or a tensile elongation. Without being bound by theory, it is believed that the resistance to deformation may significantly reduce the likelihood of damage to the first fiber web that could be induced by some physical stress. This type of stress may originate, e.g., from web handling (e.g. unwinding/rewinding, laminating, collating and slitting steps), pleating, and the cartridge assembly phase. If the second fiber web undergoes significant deformation when the product is fabricated, the stability and properties of the first fiber web may be affected.

In some embodiments, the second fiber web (e.g., calendered fiber web) may have a dry tensile strength in the machine direction of greater than or equal to about 1 lb/in, greater than or equal to about 2 lb/in, greater than or equal to about 5 lb/in, greater than or equal to about 8 lb/in, greater than or equal to about 10 lb/in, greater than or equal to about 12 lb/in, greater than or equal to about 15 lb/in, greater than or equal to about 18 lb/in, greater than or equal to about 20 lb/in, greater than or equal to about 22 lb/in, greater than or equal to about 25 lb/in, or greater than or equal to about 30 lb/in. In some instances, the dry tensile strength in the machine direction may be less than or equal to about 35 lb/in, less than or equal to about 32 lb/in, less than or equal to about 30 lb/in, less than or equal to about 28 lb/in, less than or equal to about 25 lb/in, less than or equal to about 20 lb/in, less than or equal to about 15 lb/in, less than or equal to about 10 lb/in, or less than or equal to about 5 lb/in. Combinations of the above-referenced ranges are also possible (e.g., greater than or equal to about 1 lb/in and less than or equal to about 35 lb/in, greater than or equal to about 2 lb/in and less than or equal to about 30 lb/in). Other values of dry tensile strength in the machine direction are also possible. The dry tensile strength in the machine direction may be determined according to the standard ASTM D5035-11 (2015).

In some embodiments, the second fiber web (e.g., calendered fiber web) may have a dry tensile strength in the cross direction of greater than or equal to about 1 lb/in, greater than or equal to about 2 lb/in, greater than or equal to about 5 lb/in, greater than or equal to about 8 lb/in, greater than or equal to about 10 lb/in, greater than or equal to about 12 lb/in, greater than or equal to about 15 lb/in, greater than or equal to about 18 lb/in, greater than or equal to about 20 lb/in, greater than or equal to about 22 lb/in, greater than or equal to about 25 lb/in, or greater than or equal to about 30 lb/in. In some instances, the dry tensile strength in the cross direction may be less than or equal to about 35 lb/in, less than or equal to about 32 lb/in, less than or equal to about 30 lb/in, less than or equal to about 28 lb/in, less than or equal to about 25 lb/in, less than or equal to about 20 lb/in, less than or equal to about 15 lb/in, less than or equal to about 10 lb/in, or less than or equal to about 5 lb/in. Combinations of the above-referenced ranges are also possible (e.g., greater than or equal to about 1 lb/in and less than or equal to about 35 lb/in, greater than or equal to about 2 lb/in and less than or equal to about 30 lb/in). Other values of dry tensile strength in the cross direction are also possible. The dry tensile strength in the cross direction may be determined according to the standard ASTM D5035-11 (2015).

In some embodiments, the second fiber web (e.g., calendered fiber web) may have a dry tensile elongation in the machine direction of greater than or equal to about 10%, greater than or equal to about 13%, greater than or equal to about 15%, greater than or equal to about 20%, greater than or equal to about 25%, greater than or equal to about 30%, greater than or equal to about 35%, greater than or equal to about 40%, greater than or equal to about 45%, greater than or equal to about 50%, or greater than or equal to about 55%. In some instances, the dry tensile elongation in the machine direction may be less than or equal to about 60%, less than or equal to about 55%, less than or equal to about 50%, less than or equal to about 45%, less than or equal to about 40%, less than or equal to about 35%, less than or equal to about 30%, less than or equal to about 25%, less than or equal to about 20%, or less than or equal to about 15%. Combinations of the above-referenced ranges are also possible (e.g., greater than or equal to about 10% and less than or equal to about 60%, greater than or equal to about 13% and less than or equal to 50%). Other values of dry tensile elongation in the machine direction are also possible. The dry tensile elongation in the machine direction may be determined according to the standard ASTM D5035-11 (2015).

In some embodiments, the second fiber web (e.g., calendered fiber web) may have a dry tensile elongation in the cross direction of greater than or equal to about 5%, greater than or equal to about 10%, greater than or equal to about 13%, greater than or equal to about 15%, greater than or equal to about 20%, greater than or equal to about 25%, greater than or equal to about 30%, greater than or equal to about 35%, greater than or equal to about 40%, greater than or equal to about 45%, greater than or equal to about 50%, or greater than or equal to about 55%. In some instances, the dry tensile elongation in the cross direction may be less than or equal to about 70%, less than or equal to about 65%, less than or equal to about 60%, less than or equal to about 55%, less than or equal to about 50%, less than or equal to about 45%, less than or equal to about 40%, less than or equal to about 35%, less than or equal to about 30%, less than or equal to about 25%, less than or equal to about 20%, or less than or equal to about 15%. Combinations of the above-referenced ranges are also possible (e.g., greater than or equal to about 5% and less than or equal to about 70%, greater than or equal to about 10% and less than or equal to about 60%, greater than or equal to about 13% and less than or equal to 50%). Other values of dry tensile elongation in the cross direction are also possible. The dry tensile elongation in the cross direction may be determined according to the standard ASTM D5035-11 (2015).

In some embodiments, at least a portion of a surface of the second fiber web is relatively smooth. Without being bound by theory, it is believed that: (i) smooth surfaces can provide a high degree (e.g., areal density) of contact points between the efficiency layer (e.g., fiber web having an average fiber diameter of less than or equal to about 0.5 microns) and the surface of the support layer, which may reduce the amount of localized stress on the efficiency layer under an external source of pressure; and (ii) smooth surfaces have a relatively small surface roughness, which may reduce the amount of curvature of the nanofiber layer when conforming to the smooth surface, which may reduce the amount of internal stresses in the nanofiber layer. In some instances, smoothness may be imparted to a surface of the second fiber web by one or more manufacturing and/or processing steps. For instance, in some embodiments, the second fiber web (e.g., support layer) is a calendered fiber web. Without being bound by theory, it is believed that the calendering process may decrease or eliminate the amount of loose fiber ends on the surface of the second fiber web, which might protrude into or through the efficiency layer and cause defects in the efficiency layer. In certain embodiments, fibers with different diameters (e.g., staple fibers, continuous fibers) may be mixed or used to enhance or decrease surface roughness. Non-limiting examples of methods for imparting smoothness to a surface of the second fiber web include calendering, chemical and/or bio-polishing, flame singeing, and surface coating.

In some embodiments, the root mean square of surface roughness of the second fiber web may be less than or equal to about 50 microns, less than or equal to about 40 microns, less than or equal to about 30 microns, less than or equal to about 20 microns, less than or equal to about 15 microns, less than or equal to about 12 microns, less than or equal to about 10 microns, less than or equal to about 8 microns, less than or equal to about 5 microns, or less than or equal to about 2 microns. In some instances, the root mean square of surface roughness of the second fiber web may be greater than or equal to about 1 micron, greater than or equal to about 2 microns, greater than or equal to about 3 microns, greater than or equal to about 4 microns, greater than or equal to about 5 microns, greater than or equal to about 6 microns, greater than or equal to about 8 microns, greater than or equal to about 10 microns, greater than or equal to about 15 microns, greater than or equal to about 20 microns, greater than or equal to about 30 microns, or greater than or equal to about 40 microns. Combinations of the above referenced ranges are also possible (e.g., greater than or equal to about 1 micron and less than or equal to about 50 microns, greater than or equal to about 3 microns and less than or equal to about 10 microns). The root mean square roughness of surface roughness may be determined using confocal laser microscopy. This test was performed following ISO 25178-1 (2016) standard.

In some embodiments, the second fiber web may be relatively lightweight. For instance, in some embodiments, the second fiber web may have a basis weight of less than or equal to about 50 g/m$^2$, less than or equal to about 45 g/m$^2$, less than or equal to about 40 g/m$^2$, less than or equal to about 35 g/m$^2$, less than or equal to about 30 g/m$^2$, less than or equal to about 25 g/m$^2$, less than or equal to about 20 g/m$^2$, or less than or equal to about 15 g/m$^2$. In some instances, the second fiber web may have a basis weight of greater than or equal to about 10 g/m$^2$, greater than or equal to about 15 g/m$^2$, greater than or equal to about 20 g/m$^2$, greater than or equal to about 25 g/m$^2$, greater than or equal to about 30 g/m$^2$, greater than or equal to about 35 g/m$^2$, greater than or equal to about 40 g/m$^2$, or greater than or equal to about 45 g/m$^2$. Combinations of the above-referenced ranges are also possible (e.g., greater than or equal to about 10 g/m$^2$ and less than or equal to about 50 g/m$^2$, greater than or equal to about 20 g/m$^2$ and less than or equal to about 35 g/m$^2$). Other values of basis weight are also possible.

In some embodiments, the second fiber web may be relatively thin. For instance, in some embodiments, the second fiber web may have a thickness of less than or equal to about 400 microns, less than or equal to about 350 microns, less than or equal to about 300 microns, less than or equal to about 250 microns, less than or equal to about 200 microns, less than or equal to about 180 microns, less than or equal to about 150 microns, less than or equal to about 120 microns, less than or equal to about 100 microns, less than or equal to about 80 microns, or less than or equal to about 50 microns. In some instances, the second fiber web may have a thickness of greater than or equal to about 25 microns, greater than or equal to about 30 microns, greater than or equal to about 50 microns, greater than or equal to about 80 microns, greater than or equal to about 100 microns, greater than or equal to about 120 microns, greater than or equal to about 150 microns, greater than or equal to about 180 microns, greater than or equal to about 200 microns, greater than or equal to about 220 microns, greater than or equal to about 250 microns, greater than or equal to about 280 microns, greater than or equal to about 300 microns, greater than or equal to about 320 microns, or greater than or equal to about 350 microns. Combinations of the above-referenced ranges are also possible (e.g., greater than or equal to about 25 microns and less than or equal to about 400 microns, greater than or equal to about 50 microns and less than or equal to about 180 microns). Other values of average thickness are also possible. In some embodiments, the thickness of the second fiber web may be determined according to ASTM D1777-96 (2015) using a pressure of 2.65 psi.

As described in more detail below, the second fiber web may comprise synthetic fibers, amongst other fiber types. In some instances, the second fiber web may comprise a relatively high weight percentage of synthetic fibers (e.g., greater than or equal to about 95 wt. %, 100 wt. %). In some instances, the synthetic fibers (e.g., nylon fibers, propylene fibers) may be continuous as described further below. For example, the second fiber web may comprise a relatively high percentage (e.g., greater than or equal to about 95 wt. %, 100 wt. %) of synthetic fibers formed via a meltblowing process. In general, the second fiber web may comprise synthetic fibers formed by any suitable process including a meltblown process, melt spinning process, centrifugal spinning process, non-wet laid process, and/or wetlaid process.

In some embodiments, the second fiber web may have an average fiber diameter of less than or equal to about 50 microns, less than or equal to about 45 microns, less than or equal to about 40 microns, less than or equal to about 35 microns, less than or equal to about 30 microns, less than or equal to about 25 microns, less than or equal to about 20 microns, less than or equal to about 15 microns, less than or equal to about 10 micron, or less than or equal to about 5 microns. In some instances, the average fiber diameter may be greater than or equal to about 2 microns, greater than or equal to about 5 microns, greater than or equal to about 10 micron, greater than or equal to about 15 microns, greater than or equal to about 20 micron, greater than or equal to about 25 microns, greater than or equal to about 30 microns, greater than or equal to about 35 microns, greater than or equal to about 40 microns, or greater than or equal to about 45 microns. Combinations of the above-referenced ranges are also possible (e.g., greater than or equal to about 2 microns and less than or equal to about 50 microns, greater than or equal to about 2 microns and less than or equal to about 30 microns). Other values of average fiber diameter are also possible.

As noted above, the filter media may include a third fiber web bonded (e.g., adhesively bonded, via lamination) to the first fiber web. The third fiber web may impart beneficial properties to the filter media. For instance, the third fiber web may be a non-filtration layer that serves to protect the first fiber web from potential mechanical damages during processing and handling. In some embodiments, the third fiber web is configured to act as a pre-filtration layer that increases the dirt holding capacity of the filter media. In certain embodiments, the third fiber web is configured to act as both a pre-filtration layer and a protective layer. In certain embodiments, the third fiber web may impart beneficial particulate capture properties to the filter media. For example, the third fiber web may be an efficiency layer. In some such cases, the third fiber web may have one or more properties substantially similar to and/or the same as the first fiber web. Regardless of the function of the third fiber web, the third fiber web may be bonded (e.g., via lamination, adhesively) to the first fiber web.

In some embodiments (e.g., in which the third fiber web is a non-filtration layer), the third layer may have relatively large pores. For instance, in some embodiments, the third fiber web may have a maximum pore size of greater than or equal to about 20 microns, greater than or equal to about 25 microns, greater than or equal to about 30 microns, greater than or equal to about 35 microns, greater than or equal to about 40 microns, greater than or equal to about 45 microns, greater than or equal to about 50 microns, or greater than or equal to about 55 microns. In some instances, the third fiber web may have a maximum pore size of less than or equal to about 70 microns, less than or equal to about 60 microns, less than or equal to about 56 microns, less than or equal to about 50 microns, less than or equal to about 45 microns, less than or equal to about 40 microns, less than or equal to about 35 microns, less than or equal to about 30 microns, or less than or equal to about 25 microns. Combinations of the above-referenced ranges are also possible (e.g., greater than or equal to about 20 microns and less than or equal to about 70 micron, greater than or equal to about 20 microns and less than or equal to about 60 micron, greater than or equal to about 30 microns and less than or equal to about 56 microns). Other values of maximum pore size are also possible.

In some embodiments (e.g., in which the third fiber web is a non-filtration layer), the mean flow pore size of the third fiber web may be greater than or equal to about 5 micron, greater than or equal to about 8 microns, greater than or equal to about 10 microns, greater than or equal to about 12 microns, greater than or equal to about 15 microns, greater than or equal to about 18 microns, greater than or equal to about 20 microns, greater than or equal to about 22 microns, greater than or equal to about 25 microns, or greater than or equal to about 28 microns. In some instances, the mean flow pore size may be less than or equal to about 30 microns, less than or equal to about 28 microns, less than or equal to about 25 microns, less than or equal to about 22 microns, less than or equal to about 20 microns, less than or equal to about 18 microns, less than or equal to about 15 microns, less than or equal to about 12 microns, less than or equal to about 10 microns, or less than or equal to about 8 microns. Combinations of the above-referenced ranges are also possible (e.g., greater than or equal to about 5 micron and less than or equal to about 30 microns, greater than or equal to about 15 microns and less than or equal to about 25 microns). It should be understood that in some embodiments (e.g., in which the third fiber web is a filtration layer), the maximum pore size and/or the mean flow pore size may be substantially similar to and/or the same as one or more fiber webs described herein (e.g., first fiber web, second fiber web, fourth fiber web).

In some embodiments, the third fiber web may have a basis weight of less than or equal to about 30 g/m$^2$, less than or equal to about 28 g/m$^2$, less than or equal to about 25 g/m$^2$, less than or equal to about 22 g/m$^2$, less than or equal to about 20 g/m$^2$, less than or equal to about 18 g/m$^2$, less than or equal to about 15 g/m$^2$, less than or equal to about 12 g/m$^2$, less than or equal to about 10 g/m$^2$, or less than or equal to about 8 g/m$^2$. In some instances, the third fiber web may have a basis weight of greater than or equal to about 5 g/m$^2$, greater than or equal to about 8 g/m$^2$, greater than or equal to about 10 g/m$^2$, greater than or equal to about 12 g/m$^2$, greater than or equal to about 15 g/m$^2$, greater than or equal to about 18 g/m$^2$, greater than or equal to about 20 g/m$^2$, greater than or equal to about 22 g/m$^2$, greater than or equal to about 25 g/m$^2$, or greater than or equal to about 28 g/m$^2$. Combinations of the above-referenced ranges are possible (e.g., greater than or equal to about 5 g/m$^2$ and less than or equal to about 30 g/m$^2$, greater than or equal to about 10 g/m$^2$ and less than or equal to about 25 g/m$^2$). Other values of basis weight are possible. The basis weight may be determined according to the standard ASTM D3776 (2017). It should be understood that in some embodiments (e.g., in which the third fiber web is a filtration layer), the basis weight may be substantially similar to and/or the same as one or more fiber webs described herein (e.g., first fiber web, second fiber web, fourth fiber web).

In some embodiments, the third fiber web may be relatively thin. For instance, in some embodiments, the third fiber web may have a thickness of less than or equal to about 250 microns, less than or equal to about 225 microns, less than or equal to about 200 microns, less than or equal to about 175 microns, less than or equal to about 150 microns, less than or equal to about 125 microns, or less than or equal to about 100 microns. In some instances, the third fiber web may have a thickness of greater than or equal to about 80 microns, greater than or equal to about 100 microns, greater than or equal to about 125 microns, greater than or equal to about 150 microns, greater than or equal to about 175 microns, greater than or equal to about 200 microns, or greater than or equal to about 225 microns. Combinations of the above-referenced ranges are also possible (e.g., greater than or equal to about 80 microns and less than or equal to about 250 microns, greater than or equal to about 100 microns and less than or equal to about 150 microns). Other values of average thickness are also possible. In some embodiments, the thickness may be determined according to the standard ASTM D1777-96 (2015) using a pressure of 2.65 psi. It should be understood that in some embodiments (e.g., in which the third fiber web is a filtration layer), the thickness may be substantially similar to and/or the same as one or more fiber webs described herein (e.g., first fiber web, second fiber web, fourth fiber web).

As described in more detail below, the third fiber web may comprise synthetic fibers, amongst other fiber types. In some instances, the third fiber web may comprise a relatively high weight percentage of synthetic fibers (e.g., greater than or equal to about 95 wt. %, 100 wt. %). In some instances, the synthetic fibers may be continuous as described further below. For example, the third fiber web may comprise a relatively high percentage (e.g., greater than or equal to about 95 wt. %, 100 wt. %) of synthetic fibers formed via a meltblowing process. In general, the third fiber web may comprise synthetic fibers formed by any suitable process including a meltblown process, melt spinning process, centrifugal spinning process, non-wet laid process, and/or wet-laid process.

In some embodiments, the average fiber diameter of the third fiber web may be greater than or equal to about 1 micron, greater than or equal to about 2 microns, greater than or equal to about 3 microns, greater than or equal to about 4 microns, greater than or equal to about 5 microns, greater than or equal to about 8 microns, greater than or equal to about 10 microns, greater than or equal to about 12 microns, greater than or equal to about 15 microns, or greater than or equal to about 18 microns. In some instances, the third fiber web may have an average fiber diameter of less than or equal to about 20 microns, less than or equal to about 18 microns, less than or equal to about 15 microns, less than or equal to about 12 microns, less than or equal to about 10 microns, less than or equal to about 8 microns, less than or equal to about 6 microns, less than or equal to about 5 microns, less than or equal to about 4 microns, or less than or equal to about 3 microns. Combinations of the above-referenced ranges are also possible (e.g., greater than or equal to about 1 micron and less than or equal to about 20 microns, greater than or equal to about 2 microns and less than or equal to about 15 microns). Other values of average fiber diameter are also possible. It should be understood that in some embodiments (e.g., in which the third fiber web is a filtration layer), the average fiber diameter may be substantially similar to and/or the same as one or more fiber webs described herein (e.g., first fiber web, second fiber web, fourth fiber web).

In some embodiments, one or more additional fiber webs or components are included with the filter media. In certain embodiments, the filter media may include one or more additional fiber webs. For instance, the filter media may include four or more (e.g., five or more, six or more, seven or more) fiber webs. In some embodiments, the additional fiber web may be a protective layer. For instance, the filter media may comprise a first fiber web (e.g., efficiency layer) adjacent to (e.g., directly adjacent to) a second fiber web (e.g., calendered fiber web) and a third fiber web (e.g., efficiency layer) and a fourth fiber web (e.g., protective fiber web) adjacent to (e.g., directly adjacent to) to the third fiber web. In such cases, the filter media may also comprise a fifth fiber web (e.g., support layer) adjacent to (e.g., directly adjacent to) the second fiber web. In some embodiments, the additional fiber web may be a support layer. In some such cases, the support layer (e.g., spunbond fiber web) may be adjacent to the second fiber web. As another example, the filter media may comprise a first fiber web (e.g., efficiency layer) adjacent to (e.g., directly adjacent to) a second fiber web (e.g., calendered fiber web) and a third fiber web (e.g., protective layer) and a fourth fiber web (e.g., support layer) adjacent to (e.g., directly adjacent to) to the second fiber web.

Non-limiting examples of additional fiber webs (e.g., a fourth fiber web, fifth fiber web) include a meltblown fiber web, a wet laid fiber web, a spunbond fiber web, a carded fiber web, an air-laid fiber web, a spunlace fiber web, a forcespun fiber web or an electrospun fiber web.

As noted above, filter media described herein may have a relatively small and homogeneous pore structure. In some embodiments, the filter media may have a relatively small mean flow and/or maximum pore size. For instance, in some embodiments, the filter media has a mean flow pore size of less than or equal to about 1.0 micron, less than or equal to about 0.9 microns, less than or equal to about 0.8 microns, less than or equal to about 0.7 microns, less than or equal to about 0.6 microns, less than or equal to about 0.5 microns, less than or equal to about 0.4 microns, less than or equal to about 0.3 microns, less than or equal to about 0.1 microns, or less than or equal to about 0.08 microns. In some instances, the mean flow pore size may be greater than or equal to about 0.05 microns, greater than or equal to about 0.06 microns, greater than or equal to about 0.07 microns, greater than or equal to about 0.08 microns, greater than or equal to about 0.1 microns, greater than or equal to about 0.2 microns, greater than or equal to about 0.3 microns, greater than or equal to about 0.4 microns, greater than or equal to about 0.5 microns, greater than or equal to about 0.6 microns, greater than or equal to about 0.7 microns, greater than or equal to about 0.8 microns, or greater than or equal to about 0.9 microns. Combinations of the above-referenced ranges are also possible (e.g., greater than or equal to about 0.05 microns and less than or equal to about 1 micron, greater than or equal to about 0.1 microns and less than or equal to about 0.4 microns).

In some embodiments, the filter media has a maximum pore size of less than or equal to about 2.5 microns, less than or equal to about 2.3 microns, less than or equal to about 2.0 microns, less than or equal to about 1.8 microns, less than or equal to about 1.6 microns, less than or equal to about 1.4 microns, less than or equal to about 1.3 microns, less than or equal to about 1.2 microns, less than or equal to about 1.1 microns, less than or equal to about 1.0 micron, less than or equal to about 0.9 microns, less than or equal to about 0.8 microns, less than or equal to about 0.7 microns, less than or equal to about 0.6 microns, less than or equal to about 0.5 microns, less than or equal to about 0.4 microns, less than or equal to about 0.3 microns, or less than or equal to about 0.2 microns. In some instances, the first fiber web may have a maximum pore size of greater than or equal to about 0.1 microns, greater than or equal to about 0.2 microns, greater than or equal to about 0.3 microns, greater than or equal to about 0.4 microns, greater than or equal to about 0.5 microns, greater than or equal to about 0.6 microns, greater than or equal to about 0.7 microns, greater than or equal to about 0.8 microns, greater than or equal to about 0.9 microns, greater than or equal to about 1.0 micron, greater than or equal to about 1.1 microns, greater than or equal to about 1.2 microns, greater than or equal to about 1.4 microns, greater than or equal to about 1.6 microns, greater than or equal to about 1.8 microns, greater than or equal to about 2.0 microns, or greater than or equal to about 2.2 microns. Combinations of the above-referenced ranges are also possible (e.g., greater than or equal to about 0.1 microns and less than or equal to about 2.5 microns, greater than or equal to about 0.5 microns and less than or equal to about 1.3 microns).

In some embodiments, the ratio of maximum pore size to mean flow pore size of the filter media may be less than or equal to about 5.0, less than or equal to about 4.8, less than or equal to about 4.5, less than or equal to about 4.2, less than or equal to about 4.0, less than or equal to about 3.8, less than or equal to about 3.5, less than or equal to about 3.2, less than or equal to about 3.0, less than or equal to about 2.7, less than or equal to about 2.5, less than or equal to about 2.2, less than or equal to about 2.0, less than or equal to about 1.8, less than or equal to about 1.5, or less than or equal to about 1.2. In some instances, the ratio of maximum pore size to mean flow pore size may be greater than or equal to about 1, greater than or equal to about 1.2, greater than or equal to about 1.5, greater than or equal to about 1.8, greater than or equal to about 2.0, greater than or equal to about 2.3, greater than or equal to about 2.5, greater than or equal to about 2.8, greater than or equal to about 3.0, greater than or equal to about 3.2, greater than or equal to about 3.5, greater than or equal to about 3.8, greater than or equal to about 4.0, greater than or equal to about 4.2, greater than or equal to about 4.5, or greater than or equal to about 4.8. Combinations of the above-referenced ranges are also possible (e.g., greater than or equal to about 1.0 and less than or equal to about 5.0, greater than or equal to about 2.3 and less than or equal to about 2.7).

In some embodiments, the full width at half maximum of the pore distribution of the filter media is less than or equal to about 0.2 microns, less than or equal to about 0.18 microns, less than or equal to about 0.15 microns, less than or equal to about 0.12 microns, less than or equal to about 0.1 microns, less than or equal to about 0.08 microns, less than or equal to about 0.05 microns, less than or equal to about 0.02 microns, less than or equal to about 0.01 microns, less than or equal to about 0.008 microns, less than or equal to about 0.005 microns, or less than or equal to about 0.002 microns. In some instances, the full width at half maximum of the pore distribution of the filter media is greater than or equal to about 0.001 microns, greater than or equal to about 0.002 microns, greater than or equal to about 0.004 microns, greater than or equal to about 0.006 microns, greater than or equal to about 0.008 microns, greater than or equal to about 0.01 microns, greater than or equal to about 0.02 microns, greater than or equal to about 0.05 microns, greater than or equal to about 0.08 microns, greater than or equal to about 0.1 microns, greater than or equal to about 0.12 microns, or greater than or equal to about 0.15 microns. Combinations of the above-referenced ranges are also possible (e.g., greater than or equal to about 0.001 microns and less than or equal to about 0.2 microns, greater than or equal to about 0.004 microns and less than or equal to about 0.1 microns).

The full width at half maximum (FWHM) may be determined according to the standard ASTM F316-03 (2011). Briefly, FWHM may be calculated from fitting a histogram of pore size using a log-normal distribution model. The FWHM may then be calculated based on characteristic values of the model. For example, one of skill in the art may derive the following expression for calculating FWHM for a log-normal distribution:

FWHM=EXP(Scale*SQRT(−4*Location+2*(Scale^2)−1.38629)+Location−Scale^2)−EXP(−Scale*SQRT(−4*Location+2*(Scale^2)−1.38629)+Location−Scale^2). In such embodiments, Scale and Location parameters are outcomes of the statistical model.

In some embodiments, the filter media may have a relatively uniform mean flow pore size. For example, the standard deviation in maximum pore size when measured across the fibrous layer may be relatively small. For instance, in some embodiments, the standard deviation in maximum pore size when measured across the filter media may be less than or equal to about 2 microns, less than or equal to about 1.8 microns, less than or equal to about 1.6 microns, less than or equal to about 1.4 microns, less than or equal to about 1.2 microns, less than or equal to about 1 micron, less than or equal to about 0.8 microns, less than or equal to about 0.6 microns, less than or equal to about 0.4 microns, less than or equal to about 0.2 microns, or less than or equal to about 0.1 microns. In some instances, the standard deviation in maximum pore size may be greater than or equal to about 0 microns, greater than or equal to about 0.2 micron, greater than or equal to about 0.4 microns, greater than or equal to about 0.6 microns, greater than or equal to about 0.8 microns, greater than or equal to about 1 micron, greater than or equal to 1.2 about microns, greater than or equal to about 1.4 microns, greater than or equal to about 1.6 microns, or greater than or equal to about 1.8 microns. Combinations of the above-referenced ranges are also possible (e.g., greater than or equal to about 0 microns and less than or equal to about 2 microns, greater than or equal to about 0 micron and less than or equal to about 1 micron). The standard deviation in maximum pore size may be determined according to the standard ASTM F316-03 (2011). Briefly, the maximum pore size may be taken at regularly spaced intervals (e.g., 7 inches apart) along the width of the material. The standard deviation can be determined from a statistically significant number of samples (e.g., from at least eight (8) measurements per filter media, e.g., from 12 measurements per filter media). For example, to determine the standard deviation of a filter media having an area of 1 m², a width of 2 m, and a length of 0.5 m, the mean flow pore size can be measured at 12 locations along the width of the filter media. The first measurement can be taken 4 inches from an edge of the filter media that is used to determine the width and the last measurement can be taken 4 inches from the other edge used to determine the width. The remaining measurements can be spaced across the width, such that the 12 measurements are approximately equidistant apart. The standard deviation can be calculated using methods known to those of ordinary skill in the art.

In some embodiments, the water bubble point of the filter media and/or a fiber web (e.g., first fiber web) may be greater than or equal to about 30 psi, greater than or equal to about 40 psi, greater than or equal to about 50 psi, greater than or equal to about 60 psi, greater than or equal to about 65 psi, greater than or equal to about 70 psi, greater than or equal to about 75 psi, greater than or equal to about 80 psi, greater than or equal to about 85 psi, greater than or equal to about 90 psi, or greater than or equal to about 95 psi. In some instances, the water bubble point may be less than or equal to about 120 psi, less than or equal to about 110 psi, less than or equal to about 100 psi, less than or equal to about 95 psi, less than or equal to about 90 psi, less than or equal to about 85 psi, less than or equal to about 80 psi, less than or equal to about 75 psi, less than or equal to about 70 psi, or less than or equal to about 60 psi. Combinations of the above-referenced ranges are also possible (e.g., greater than or equal to about 30 psi and less than or equal to about 120 psi, greater than or equal to about 60 psi and less than or equal to about 100 psi, greater than or equal to about 60 psi and less than or equal to about 90 psi). Other values of water bubble point are also possible. The water bubble point may be determined according to according to the standard ASTM F-316-80 Method B, BS6410 (2011).

In some embodiments, the filter media may be relatively thin. For instance, in some embodiments, the thickness of the filter media may be less than or equal to about 400 microns, less than or equal to about 375 microns, less than or equal to about 350 microns, less than or equal to about 325 microns, less than or equal to about 300 microns, less than or equal to about 275 microns, less than or equal to about 250 microns, less than or equal to about 225 microns, less than or equal to about 200 microns, less than or equal to about 175 microns, less than or equal to about 150 microns, or less than or equal to about 125 microns. In some instances, the thickness may be greater than or equal to about 100 microns, greater than or equal to about 130 microns, greater than or equal to about 150 microns, greater than or equal to about 175 microns, greater than or equal to about 200 microns, greater than or equal to about 225 microns, greater than or equal to about 250 microns, greater than or equal to about 275 microns, greater than or equal to about 300 microns, greater than or equal to about 325 microns, or greater than or equal to about 350 microns. Combinations of the above referenced ranges are also possible (e.g., greater than or equal to about 100 microns and less than or equal to about 400 microns, greater than or equal to about 130 microns and less than or equal to about 300 microns). In some embodiments, the thickness may be determined according to the standard ASTM D1777-96 (2015) at 2.6 psi.

In some embodiments, the filter media may be relatively lightweight. For instance, in some embodiments, the filter media may have a basis weight of less than or equal to about 80 g/m$^2$, less than or equal to about 75 g/m$^2$, less than or equal to about 70 g/m$^2$, less than or equal to about 65 g/m$^2$, less than or equal to about 62 g/m$^2$, less than or equal to about 60 g/m$^2$, less than or equal to about 58 g/m$^2$, less than or equal to about 55 g/m$^2$, less than or equal to about 52 g/m$^2$, less than or equal to about 50 g/m$^2$, less than or equal to about 48 g/m$^2$, or less than or equal to about 45 g/m$^2$. In some instances, the filter media may have a basis weight of greater than or equal to about 40 g/m$^2$, greater than or equal to about 42 g/m$^2$, greater than or equal to about 45 g/m$^2$, greater than or equal to about 48 g/m$^2$, greater than or equal to about 50 g/m$^2$, greater than or equal to about 55 g/m$^2$, greater than or equal to about 60 g/m$^2$, greater than or equal to about 65 g/m$^2$, greater than or equal to about 70 g/m$^2$, or greater than or equal to about 75 g/m$^2$. Combinations of the above-referenced ranges are also possible (e.g., greater than or equal to about 40 g/m$^2$ and less than or equal to about 80 g/m$^2$, greater than or equal to about 45 g/m$^2$ and less than or equal to about 62 g/m$^2$). The basis weight may be determined according to the standard ASTM D3776 (2013).

As noted above, the filter media, described herein, may be used for a wide range of applications that may require a certain level of particulate efficiency. The particulate efficiency may be determined as a percentage of upstream monodisperse challenge particles in a feed stream retained by the filter media, or 100% minus a percentage of particles from a feed stream remaining in a permeate stream downstream of the filter media. A beta ratio may be determined, as a number of particles upstream of a filter media divided by a number of particles downstream of the filter media. In some embodiments, particulate efficiency is measured, e.g., for flatsheet filter media, according to International Filter & Testing Services (IFTS) method IFTS-FEEEIS-01:2013. Briefly, this test, when applied to flatsheet filter media, is an efficiency test that involves challenging a flatsheet filter media with a challenge solution of monodisperse particles of more than one size, with particles between or equal to 0.1 microns and 1.5 microns in size, and measuring the number of particles having different sizes that are upstream and downstream of the flatsheet filter media, where a flow rate of the challenge solution may be, e.g., 1 L/min. Filter media specimens used in these measurement tests may be circular in shape and have an effective area of 95 cm$^2$. The particulate efficiency measurements may be conducted at a constant flow rate of 1 liter per minute through the media over the test period. The difference between the number of particles having a particle size that are upstream of the flatsheet filter media (the upstream particle count) and the number of particles having the particle size that are downstream of the flatsheet filter media (the downstream particle count), divided by the upstream particle count, multiplied by 100, gives an efficiency percentage of the media for the particle size, for example for 0.45 micron particle size.

In some embodiments, the filter media may still have a relatively high particulate efficiency. For instance, the particulate efficiency of the filter media may be greater than conventional membrane filters. In some embodiments, the particulate efficiency for particles 0.45 micron in size or greater may be greater than or equal to about 99%, greater than or equal to about 99.5%, greater than or equal to about 99.9%, greater than or equal to about 99.95%, or greater than or equal to about 99.99%. In some instances, the filter media and/or a fiber web may have a particulate efficiency of less than 100%, less than or equal to about 99.99%, or less than or equal to about 99.9%. Combinations of the above referenced ranges are also possible (e.g., greater than or equal to about 99% and less than 100%, greater than or equal to about 99% and less than or equal to about 99.99%, greater than or equal to about 99% and less than or equal to about 99.9%). In some embodiments, particulate efficiency is measured, e.g., for flatsheet filter media, according to International Filter & Testing Services (IFTS) method IFTS-FEEEIS-01: 2013, monitoring particles 0.45 microns in size.

In some embodiments, the filter media may still have a relatively high particulate efficiency. For instance, the particulate efficiency of the filter media may be greater than conventional membrane filters. In some embodiments, the particulate efficiency for particles 0.3 micron in size or greater may be greater than or equal to about 99%, greater than or equal to about 99.5%, greater than or equal to about 99.9%, greater than or equal to about 99.95%, or greater than or equal to about 99.99%, =. In some instances, the filter media and/or a fiber web may have a particulate efficiency of less than 100%, less than or equal to about 99.99%, or less than or equal to about 99.9%. Combinations of the above referenced ranges are also possible (e.g., greater than or equal to about 99% and less than 100%, greater than or equal to about 99% and less than or equal to about 99.99%, greater than or equal to about 99% and less than or equal to about 99.9%). The particulate efficiency may be measured, e.g., for flatsheet filter media, according to International Filter & Testing Services (IFTS) method IFTS-FEEEIS-01:2013, monitoring particles 0.3 microns in size.

In some embodiments, the filter media may still have a relatively high particulate efficiency. For instance, in some embodiments, the particulate efficiency for particles 0.2 micron in size or greater may be greater than or equal to about 80%, greater than or equal to about 85%, greater than or equal to about 90%, greater than or equal to about 95%, greater than or equal to about 97%, greater than equal to about 99%, greater than or equal to about 99.9%, greater than or equal to about 99.95%, or greater than or equal to about 99.99%. In some instances, the filter media and/or a fiber web may have a particulate efficiency of less than 100%, less than or equal to about 99.99%, less than or equal to about 99.95%, less than or equal to about 99.9%, less than or equal to about 99.5%, less than or equal to about 99%, less than or equal to about 97%, less than or equal to about 95%, less than or equal to about 90%, or less than or equal to about 85%. Combinations of the above referenced ranges are also possible (e.g., greater than or equal to about 80% and less than 100%, greater than or equal to about 80% and less than or equal to about 99.9%, greater than or equal to about 90% and less than or equal to about 99.99%). In some embodiments, particulate efficiency is measured, e.g., for flatsheet filter media, according to International Filter & Testing Services (IFTS) method IFTS-FEEEIS-01:2013, monitoring particles 0.2 microns in size.

In some embodiments, a fiber web and/or filter media may be designed for sterile filtration. In some such embodiments, the particulate efficiency may be very high (e.g., greater than or equal to about 99.999%). In some embodiments, the particulate efficiency of the filter media and/or a fiber web may be expressed in terms of Log Reduction Value (i.e., LRV), which is a quantitative measure of microorganism retention by a fiber web or filter media. LRV is the logarithm of a beta ratio and is expressed as follows:

LRV=Log {[CFU]challenge/[CFU]effluent]} wherein [CFU]challenge is the total number of bacteria in colony forming units in the fluid before passage through the filter media and/or a fiber web and [CFU]effluent is the total number of bacteria in colony forming units in the fluid after passage through the filter media and/or a fiber web.

LRV may be determined using ASTM F838-05 (2005). A filter media is considered sterile when the [CFU]effluent is zero; however, if the [CFU]effluent is zero, one is used in the above equation to calculate LRV. Briefly, *Brevundimonas diminuta* at a concentration of $10^7$ CFU/1 $cm^2$ of sample area for a 76 $cm^2$ sample area may be used as the challenge. Therefore, the [CFU]challenge is $7.6 \times 10^8$. An LRV of 8.88 is considered sterile. In some embodiments, the filter media and/or a fiber web may have an LRV of greater than 4 LRV, e.g., between or equal to 4 LRV and 9 LRV (e.g., 6 LRV). In some embodiments, the filter media and/or a fiber web may have an LRV of 8.88. In some embodiments, the filter media and/or a fiber web may have an LRV of about 6. Such filter media could be used to reduce bioburden and remove some unwanted biological particulates and thereby extend the service life of a final-stage filter. Such filter media could be used as a final-stage filter to support industrial applications for the water, microelectronic, chemical, food and beverage and biomedical markets.

In some embodiments, the filter media described herein has a relatively high water permeability. For instance, in some embodiments, the water permeability of the filter media and/or a fiber web may be greater than or equal to about 2 ml/min·$cm^2$·psi, greater than or equal to about 3 ml/min·$cm^2$·psi, greater than or equal to about 4 ml/min·$cm^2$·psi, greater than or equal to about 5 ml/min·$cm^2$·psi, greater than or equal to about 6 ml/min·$cm^2$·psi, greater than or equal to about 7 ml/min·$cm^2$·psi, or greater than or equal to about 8 ml/min·$cm^2$·psi. In some instances, the water permeability of the filter media may be less than or equal to about 9 ml/min·$cm^2$·psi, less than or equal to about 8 ml/min·$cm^2$·psi, less than or equal to about 7 ml/min·$cm^2$·psi, less than or equal to about 6 ml/min·$cm^2$·psi, less than or equal to about 5 ml/min·$cm^2$·psi, less than or equal to about 4 ml/min·$cm^2$·psi, or less than or equal to about 3 ml/min·$cm^2$·psi. It should be understood that all combinations of the above-referenced ranges are possible (e.g., greater than or equal to about 2 ml/min·$cm^2$·psi and less than or equal to about 9 ml/min·$cm^2$·psi, greater than or equal to about 3 ml/min·$cm^2$·psi and less than or equal to about 6 ml/min·$cm^2$·psi). Other ranges are also possible.

Water permeability is the water flux divided by the pressure (e.g., 20 psi) used to determine the water flow rate. Water flow rate is measured by passing deionized water through a filter media or fiber web having an effective filtration area of 12.5 $cm^2$ at a pressure of 20 psi until 1,000 ml of water has been collected. The flow rate is determined by measuring the time until 1,000 ml of water has been collected. Water flux is calculated by dividing the flow rate (ml/min) by a sample effective area ($cm^2$) of the fiber web (i.e., the area exposed to fluid flow) and is expressed in ml/min·$cm^2$.

In some embodiments, the filter media may have a relatively high air permeability. For instance, in some embodiments, the filter media may have an air permeability of greater than or equal to about 0.5 CFM, greater than or equal to about 1 CFM, greater than or equal to about 2 CFM, greater than or equal to about 3 CFM, greater than or equal to about 4 CFM, greater than or equal to about 5 CFM, greater than or equal to about 6 CFM, greater than or equal to about 7 CFM, greater than or equal to about 8 CFM, or greater than or equal to about 9 CFM. In some instances, the air permeability may be less than or equal to about 10 CFM, less than or equal to about 9 CFM, less than or equal to about 8 CFM, less than or equal to about 7 CFM, less than or equal to about 6 CFM, less than or equal to about 5 CFM, less than or equal to about 4 CFM, less than or equal to about 3 CFM, or less than or equal to about 2 CFM. All combinations of the above-referenced ranges are possible (e.g., greater than about 0.5 CFM and less than or equal to about 10 CFM, greater than about 1 CFM and less than or equal to about 6 CFM). The air permeability may be determined according to the standard ASTM D737-04 (2016).

In some embodiments, the dirt holding capacity of the filter media is relatively high. For instance, filter media, described herein, may have a significantly higher dirt holding capacity than membrane filters and/or other conventional liquid filter media. In some embodiments, the dirt holding capacity of the filter media described herein is at least 5% greater than (e.g., between about 5% and about 20% greater than) conventional membrane filters. In some embodiments, the relatively high dirt holding capacity may be due, at least in part, to the second fiber web and/or third fiber web. In some cases, the second fiber web and/or third fiber web may function as a pre-filter or capacity layer. In such cases, the basis weight and pore size as well as other properties of these fiber webs are selected to enhance dirt holding capacity while having relatively minimal or no adverse effects on one or more properties of the filter media that are important for a given application, such as pore size distribution.

In some embodiments, the dirt holding capacity of the filter media may be greater than or equal to about 20 mg/cm$^2$, greater than or equal to about 22 mg/cm$^2$, greater than or equal to about 25 mg/cm$^2$, greater than or equal to about 28 mg/cm$^2$, greater than or equal to about 30 mg/cm$^2$, greater than or equal to about 32 mg/cm$^2$, greater than or equal to about 35 mg/cm$^2$, or greater than or equal to about 38 mg/cm$^2$. In some instances, the dirt holding capacity of the filter media may be less than or equal to about 40 mg/cm$^2$, less than or equal to about 38 mg/cm$^2$, less than or equal to about 35 mg/cm$^2$, less than or equal to about 32 mg/cm$^2$, less than or equal to about 30 mg/cm$^2$, less than or equal to about 28 mg/cm$^2$, less than or equal to about 25 mg/cm$^2$, or less than or equal to about 22 mg/cm$^2$. Combinations of the above-referenced ranges are also possible (e.g., greater than or equal to about 20 mg/cm$^2$ and less than or equal to about 40 mg/cm$^2$, greater than or equal to about 30 mg/cm$^2$ and less than or equal to about 40 mg/cm$^2$). Other values are also possible. The dirt holding capacity may be determined by using a modified version of EN-13443-2 (2005). Briefly, the dirt holding capacity test consisted of flowing through the filter media an aqueous dispersion of fine clay dust Jetfine 1A at a concentration of 100 mg/L. The flow rate was held constant at 1 liter per minute and the sample effective area was equal to 95 cm$^2$. The filtration test was stopped when the pressure drop generated across the media rises—due to clogging—up to 2 bars. The weight gain due to fouling was determined by weighing the sample mass, in a dry state, before and after the filtration step.

In some embodiments, the pressure drop across the filter media may be relatively low. For instance, in some embodiments, the pressure drop across the filter media may less than or equal to about 1 psi, less than or equal to about 0.9 psi, less than or equal to about 0.8 psi, less than or equal to about 0.7 psi, less than or equal to about 0.6 psi, less than or equal to about 0.5 psi, less than or equal to about 0.4 psi, less than or equal to about 0.3 psi, or less than or equal to about 0.2 psi. In some instances, the filter media may have a pressure drop of greater than or equal to about 0.1 psi, greater than or equal to about 0.2 psi, greater than or equal to about 0.3 psi, greater than or equal to about 0.4 psi, greater than or equal to about 0.5 psi, greater than or equal to about 0.6 psi, greater than or equal to about 0.7 psi, greater than or equal to about 0.8 psi, or greater than or equal to about 0.9 psi. Combinations of the above-referenced ranges are also possible (e.g., greater than or equal to about 0.1 psi and less than or equal to about 1 psi, greater than or equal to about 0.1 psi and less than or equal to about 0.5 psi. Other values of pressure drop are also possible. The flatsheet pressure drop can be measured using the NF X 45-302 (2000) test method. The pressure drop was measured using clean water with a flow rate of 1 liter per minute through the filter media.

In some embodiments, the two or more fiber webs (e.g., first, second, and/or third fiber webs) in the filter media may have certain properties (e.g., water contact angle, surface energy) that are similar or substantially the same. The similarities between the webs may serve to enhance the permeability to certain fluids (e.g., water), the bonding between the fiber webs, and/or the structural stability of the filter media under various conditions (e.g., high temperature, high pressure, steam sterilization). For instance, a filter media comprising fiber webs having substantially the same or similar water contact angle, critical surface tension, and/or critical wetting surface tension may exhibit enhanced wetting characteristics (e.g., fluid absorption and permeability) and/or bonding compared to a filter media comprising first and second fiber webs that are dissimilar with respect to these properties. In some such embodiments, two or more fiber webs (e.g., first, second, and/or third fiber webs) may differ in water contact angle by less than or equal to about 20° (e.g., less than or equal to about 15°), in critical surface tension by less than or equal to about 15 dynes/cm (e.g., less than or equal to about 7 dynes/cm) and/or differ in critical wetting surface tension by less than or equal to about 15 dynes/cm (e.g., less than or equal to about 5 dynes/cm).

In some embodiments, two or more fiber webs (e.g., first, second, and/or third fiber webs) may comprise substantially the same or similar materials, e.g., in order to enhance bonding between layers resulting from a heat lamination process. For example, the first, second, and/or third fiber webs may comprise nylon, or any suitable material described herein. In some embodiments, the first, second, and/or third fiber webs comprise a material (e.g., nylon) such that water has a relatively low contact angle with the fibers (e.g., less than 90 degrees, less than or equal to about 75 degrees, less than or equal to about 60 degrees, less than or equal to about 30 degrees) to facilitate high flow rate of aqueous fluid through the filter media during filtration of the aqueous fluid by the filter media.

As used herein, the critical wetting surface tension of a fiber web or layer (e.g., support layer) is defined as the mean of the surface tension of the last liquid in a series that is absorbed by the fiber web or layer and the surface tension of the first liquid in a series that is not absorbed by the fiber web or layer using the test described below. The critical wetting surface tension of a fiber web or layer may be determined by applying a series of liquids in a sequential manner (i.e., from lowest surface tension to highest surface tension) to the surface of the fiber web or layer and observing the absorption or non-absorption of each liquid as described in U.S. Pat. No. 4,880,548, which is incorporated by reference in its entirety, e.g., under "Wetting of Fibrous Media." The technique involves placing ten drops of a first liquid and 10 drops of a second liquid onto representative portions of the fiber web or layer and allowing the drops to stand for 10 minutes. The diameter of the droplets is between 3 mm and 5 mm. The two liquids should be selected so that the difference in surface tension between them is about 2 dynes/cm. Absorption is defined as the wetting of a fiber web or layer on its top and bottom surface by at least nine of the ten drops within 10 minutes. Non-absorption is defined when at least nine of the ten drops will not fully penetrate through the porous media, i.e., the bottom surface remains dry. Testing is continued using liquids of successively higher or lower surface tension, until a pair has been identified, one absorbing and one non-absorbing, which are the most closely spaced in surface tension. The critical wetting surface tension is then within that range and the average of the two surface tensions is used as a single number to specify the critical wetting surface tension.

In some embodiments, two or more fiber webs (e.g., first, second, and/or third fiber webs) may differ in critical wetting surface tension by less than or equal to about 15 dynes/cm, less than or equal to about 12 dynes/cm, less than or equal to about 10 dynes/cm, less than or equal to about 8 dynes/cm, less than or equal to about 5 dynes/cm, less than or equal to about 3 dynes/cm, or less than or equal to about 1 dynes/cm and greater than or equal to about 0 dynes/cm. In some embodiments, the critical wetting surface tensions may be substantially the same. In certain embodiments, the difference in critical wetting surface tension may be greater than about 0 dynes/cm.

In some embodiments, the critical wetting surface tension on the two or more fiber webs (e.g., first, second, and/or third fiber webs) may be greater than or equal to about 10 dynes/cm, greater than or equal to about 15 dynes/cm, greater than or equal to about 25 dynes/cm, greater than or equal to about 30 dynes/cm, greater than or equal to about 40 dynes/cm, greater than or equal to about 50 dynes/cm, greater than or equal to about 60 dynes/cm, greater than or equal to about 70 dynes/cm, greater than or equal to about 80 dynes/cm, or greater than or equal to about 90 dynes/cm.

In some instances, two or more fiber webs (e.g., first, second, and/or third fiber webs) may have a critical wetting surface tension of less than or equal to about 110 dynes/cm, less than or equal to about 100 dynes/cm, less than or equal to about 90 dynes/cm, less than or equal to about 80 dynes/cm, less than or equal to about 72 dynes/cm, less than or equal to about 60 dynes/cm, less than or equal to about 50 dynes/cm, less than or equal to about 40 dynes/cm, less than or equal to about 30 dynes/cm, or less than or equal to about 20 dynes/cm.

Combinations of the above-referenced ranges are possible (e.g., greater than or equal to about 10 dynes/cm and less than or equal to about 110 dynes/cm, greater than or equal to about 25 dynes/cm and less than or equal to about 72 dynes/cm). Other values of the critical wetting surface tension are possible.

In some embodiments, the weight percentage of the first fiber web in the filter media may be less than or equal to about 10%, less than or equal to about 9%, less than or equal to about 8%, less than or equal to about 7%, less than or equal to about 6%, less than or equal to about 5%, less than or equal to about 4%, less than or equal to about 3%, less than or equal to about 2%, or less than or equal to about 1%. In some instances, the weight percentage of the first fiber web in the filter media may be greater than or equal to about 0.8%, greater than or equal to about 1%, greater than or equal to about 1.2%, greater than or equal to about 1.5%, greater than or equal to about 2%, greater than or equal to about 3%, greater than or equal to about 4%, greater than or equal to about 5%, greater than or equal to about 6%, greater than or equal to about 7%, greater than or equal to about 8%, or greater than or equal to about 9%. Combinations of the above-referenced ranges are also possible (e.g., greater than or equal to about 0.8% and less than or equal to about 10%, greater than or equal to about 1.5% and less than or equal to about 4%).

In some embodiments, the weight percentage of the second fiber web and/or support layer in the filter media may be greater than or equal to about 40%, greater than or equal to about 42%, greater than or equal to about 45%, greater than or equal to about 48%, greater than or equal to about 50%, greater than or equal to about 52%, greater than or equal to about 55%, greater than or equal to about 58%, greater than or equal to about 60%, greater than or equal to about 62%, or greater than or equal to about 65%. In some instances, the weight percentage of the second fiber web in the filter media may be less than or equal to about 70%, less than or equal to about 68%, less than or equal to about 65%, less than or equal to about 60%, less than or equal to about 58%, less than or equal to about 55%, less than or equal to about 52%, less than or equal to about 50%, or less than or equal to about 45%. Combinations of the above-referenced ranges are also possible (e.g., greater than or equal to about 40% and less than or equal to about 70%, greater than or equal to about 48% and less than or equal to about 65%).

In some embodiments, the weight percentage of the third fiber web in the filter media may be greater than or equal to about 30%, greater than or equal to about 32%, greater than or equal to about 35%, greater than or equal to about 38%, greater than or equal to about 40%, greater than or equal to about 42%, greater than or equal to about 45%, greater than or equal to about 48%, greater than or equal to about 50%, greater than or equal to about 52%, or greater than or equal to about 55%. In some instances, the weight percentage of the third fiber web in the filter media may be less than or equal to about 60%, less than or equal to about 58%, less than or equal to about 55%, less than or equal to about 52%, less than or equal to about 50%, less than or equal to about 48%, less than or equal to about 45%, less than or equal to about 42%, less than or equal to about 40%, less than or equal to about 38%, or less than or equal to about 35%. Combinations of the above-referenced ranges are also possible (e.g., greater than or equal to about 30% and less than or equal to about 60%, greater than or equal to about 35% and less than or equal to about 48%).

*Fiber Webs/Filter Media—Synthetic Fibers

In general, any fiber web in the filter media, and accordingly the filter media, may include any suitable fiber type. In some embodiments, one or more fiber web (e.g., first fiber web) and/or the entire filter media may include a single fiber type (e.g., synthetic fibers). For example, in certain embodiments, one or more fiber web and/or the entire filter media may include synthetic fibers (e.g., nylon, silica, rayon, Lyocell, polyvinylidene fluoride, polytetrafluoroethylene, polypropylene, polyethersulfone, polyethylene terephthalate, polybutylene terephthalate) as described herein.

In some embodiments, the fibers in a fiber web (e.g., first fiber web, second fiber web) may have an average length which may depend on the method of formation of the fibers. For instance, in some embodiments, fibers formed by an electrospinning (e.g., solvent electrospinning, melt electrospinning), a melt-blown, a meltspun, or a centrifugal spinning process may be continuous (e.g., greater than about 5 cm, greater than about 50 cm, greater than about 200 cm).

In some embodiments, the filter media (e.g., filter media 100, filter media 120, and 140) may comprise synthetic fibers. For instance, in some embodiments, the efficiency layer (e.g., first fiber web) and/or the support layer (e.g., second fiber web) may comprise synthetic fibers. The synthetic fibers may have a relatively small average fiber diameter (e.g., less than or equal to about 2 microns). For instance, the synthetic fibers in the first fiber web may have an average diameter of less than or equal to about 0.5 microns (e.g., between about 0.05 microns and 0.5 microns). In some embodiments, the synthetic fibers in first fiber web 15, second fiber web 20, and/or filter media 10 may be continuous fibers formed by any suitable process (e.g., a melt-blown, a meltspun, an electrospinning, a spunbond, a centrifugal spinning process). In certain embodiments, the synthetic fibers may be formed by an electrospinning process (e.g., melt electrospinning, solvent electrospinning). In other embodiments, the synthetic fibers may be non-continuous. In some embodiments, all of the fibers in the filter media are synthetic fibers. In certain embodiments, all of the fibers in first fiber web 15 and/or second fiber web 20 are synthetic fibers. In some such cases, all of the fibers in first fiber web 15 and/or second fiber web 20 are continuous fibers.

Synthetic fibers may include any suitable type of synthetic polymer or other material. Examples of suitable synthetic fibers include polyimide, aliphatic polyamide (e.g., nylon 6), aromatic polyamide, polysulfone, cellulose acetate, polyether sulfone, polyaryl ether sulfone, modified polysulfone polymers, modified polyethersulfone polymers, polymethyl methacrylate, polyacrylonitrile, polyurethane, poly(urea urethane), polybenzimidazole, polyetherimide, polyacrylonitrile, poly(ethylene terephthalate), polypropylene, silicon dioxide (silica), regenerated cellulose (e.g., Lyocell, rayon), carbon (e.g., derived from the pyrolysis of polyacrilonitrile), polyaniline, poly(ethylene oxide), poly (ethylene naphthalate), poly(butylene terephthalate), styrene butadiene rubber, polystyrene, poly(vinyl chloride), poly (vinyl alcohol), poly(vinylidene fluoride), poly(vinyl butylene) and copolymers or derivative compounds thereof, and combinations thereof. In some embodiments, the synthetic fibers are organic polymer fibers. Synthetic fibers may also include multi-component fibers (i.e., fibers having multiple compositions such as bicomponent fibers). In some cases, synthetic fibers may include electrospun (e.g., melt, solvent), meltblown, meltspun, or centrifugal spun fibers, which may be formed of polymers described herein (e.g., nylon, polyester, polypropylene). In some embodiments, synthetic fibers may be electrospun fibers. The filter media, as well as each of the fiber webs within the filter media, may also include combinations of more than one type of synthetic fiber. It should be understood that other types of synthetic fiber types may also be used.

In some cases, the synthetic fibers (e.g., in the first and/or second fiber webs) may be continuous (e.g., electrospun fibers, meltblown fibers, spunbond fibers, centrifugal spun fibers, etc.). For instance, synthetic fibers may have an average length of at least about 5 cm, at least about 10 cm, at least about 15 cm, at least about 20 cm, at least about 50 cm, at least about 100 cm, at least about 200 cm, at least about 500 cm, at least about 700 cm, at least about 1000 cm, at least about 1500 cm, at least about 2000 cm, at least about 2500 cm, at least about 5000 cm, at least about 10000 cm; and/or less than or equal to about 10000 cm, less than or equal to about 5000 cm, less than or equal to about 2500 cm, less than or equal to about 2000 cm, less than or equal to about 1000 cm, less than or equal to about 500 cm, or less than or equal to about 200 cm. Combinations of the above-referenced ranges are also possible (e.g., greater than or equal to about 100 cm and less than or equal to about 2500 cm). Other values of average fiber length are also possible.

In other embodiments, the synthetic fibers are not continuous (e.g., staple fibers). In general, synthetic non-continuous fibers may be characterized as being shorter than continuous synthetic fibers. For instance, in some embodiments, synthetic fibers in one or more fiber webs (e.g., second fiber web) in the filter media may have an average length of at least about 0.1 mm, at least about 0.5 mm, at least about 1.0 mm, at least about 1.5 mm, at least about 2.0 mm, at least about 3.0 mm, at least about 4.0 mm, at least about 5.0 mm, at least about 6.0 mm, at least about 7.0 mm, at least about 8.0 mm, at least about 9.0 mm, at least about 10.0 mm, at least about 12.0 mm, at least about 15.0 mm; and/or less than or equal to about 15.0 mm, less than or equal to about 12.0 mm, less than or equal to about 10.0 mm, less than or equal to about 5.0 mm, less than or equal to about 4.0 mm, less than or equal to about 1.0 mm, less than or equal to about 0.5 mm, or less than or equal to about 0.1 mm. Combinations of the above-referenced ranges are also possible (e.g., at least about 1.0 mm and less than or equal to about 4.0 mm). Other values of average fiber length are also possible.

In some embodiments in which synthetic fibers are included in one or more fiber webs and/or the entire filter media, the weight percentage of synthetic fibers in one or more fiber webs (e.g., first fiber web, second fiber web) and/or the entire filter media may be greater than or equal to about 1%, greater than or equal to about 20%, greater than or equal to about 40%, greater than or equal to about 60%, greater than or equal to about 75%, greater than or equal to about 90%, or greater than or equal to about 95%.

In some instances, the weight percentage of synthetic fibers in the second fiber web may be less than or equal to about 100%, less than or equal to about 98%, less than or equal to about 85%, less than or equal to about 75%, less than or equal to about 50%, or less than or equal to about 10%.

Combinations of the above-referenced ranges are also possible (e.g., greater than or equal to about 75% and less than or equal to about 100%). Other values of weight percentage of synthetic fibers are also possible. In some embodiments, one or more fiber webs (e.g., first fiber web, second fiber web) and/or the entire filter media includes 100% synthetic fibers.

In one set of embodiments, one or more fiber webs (e.g., second fiber web) in the filter media may include bicomponent fibers. The bicomponent fibers may comprise a thermoplastic polymer. Each component of the bicomponent fiber can have a different melting temperature. For example, the fibers can include a core and a sheath where the activation temperature of the sheath is lower than the melting temperature of the core. This allows the sheath to melt prior to the core, such that the sheath binds to other fibers in the fiber web, while the core maintains its structural integrity. The core/sheath binder fibers can be concentric or non-concentric. Other exemplary bicomponent fibers can include split fiber fibers, side-by-side fibers, and/or "island in the sea" fibers.

In some embodiments, bicomponent fibers may have an average length of at least about 0.1 mm, at least about 0.5 mm, at least about 1.0 mm, at least about 1.5 mm, at least about 2.0 mm, at least about 3.0 mm, at least about 4.0 mm, at least about 5.0 mm, at least about 6.0 mm, at least about 7.0 mm, at least about 8.0 mm, at least about 9.0 mm, at least about 10.0 mm, at least about 12.0 mm, at least about 15.0 mm; and/or less than or equal to about 15.0 mm, less than or equal to about 12.0 mm, less than or equal to about 10.0 mm, less than or equal to about 5.0 mm, less than or equal to about 4.0 mm, less than or equal to about 1.0 mm, less than or equal to about 0.5 mm, or less than or equal to about 0.1 mm. Combinations of the above-referenced ranges are also possible (e.g., at least about 1.0 mm and less than or equal to about 4.0 mm). Other values of average fiber length are also possible.

In some embodiments in which bicomponent fibers are included in one or more fiber webs (e.g., second fiber web) and/or the entire filter media, the weight percentage of bicomponent fibers in one or more fiber webs and/or the entire filter media may be, for example, greater than or equal to about 1%, greater than or equal to about 5%, greater than or equal to about 10%, greater than or equal to about 15%, greater than or equal to about 30%, or greater than or equal to about 45%. In some instances, the weight percentage of bicomponent fibers in one or more fiber webs and/or the entire filter media may be less than or equal to about 70%, less than or equal to about 50%, less than or equal to about 25%, less than or equal to about 10%, less than or equal to about 5%, or less than or equal to about 1%. Combinations of the above-referenced ranges are also possible (e.g., greater than or equal to about 30% and less than or equal to about 70%). Other values of weight percentage of the bicomponent fibers are also possible. In other embodiments, one or more fiber webs (e.g., second fiber web) and/or the entire filter media may include 0% bicomponent fibers.

In some embodiments in which the second fiber web comprises non-continuous fibers, the second fiber web may comprise glass fibers.

In some embodiments, one or more layers (e.g., second fiber web, third fiber web) and/or the entire filter media is substantially free of glass fibers (e.g., less than 1 wt % glass fibers, between about 0 wt % and about 1 wt % glass fibers). For instance, the first fiber web, second fiber web, third fiber web and/or the entire filter media may include 0 wt % glass fibers. Filter media and arrangements that are substantially free of glass fibers may be advantageous for certain applications (e.g., fuel-water separation, particulate separation in fuel systems), since glass fibers may shed and leach sodium ions (e.g., Nat) which can lead to physical abrasion and soap formation. For example, shedding of glass fibers may lead to the blockage of fuel injectors such as in high pressure common rail applications. In other embodiments, the second layer may optionally include glass fibers (e.g., microglass and/or chopped glass fibers).

In other embodiments, however, one or more layers and/or the entire filter media may include glass fibers (e.g., microglass fibers, chopped strand glass fibers, or a combination thereof). The average diameter of glass fibers may be, for example, less than or equal to about 30 microns, less than or equal to about 25 microns, less than or equal to about 15 microns, less than or equal to about 12 microns, less than or equal to about 10 microns, less than or equal to about 9 microns, less than or equal to about 7 microns, less than or equal to about 5 microns, less than or equal to about 3 microns, or less than or equal to about 1 micron. In some instances, the glass fibers may have an average fiber diameter of greater than or equal to about 0.1 microns, greater than or equal to about 0.3 microns, greater than or equal to about 1 micron, greater than or equal to about 3 microns, or greater than equal to about 7 microns greater than or equal to about 9 microns, greater than or equal to about 11 microns, or greater than or equal to about 20 microns. Combinations of the above-referenced ranges are also possible (e.g., greater than or equal to about 0.1 microns and less than or equal to about 9 microns). Other values of average fiber diameter are also possible.

In some embodiments, the weight percentage of the glass fibers may be greater than or equal to about 0 wt %, greater than or equal to about 2 wt %, greater than or equal to about 5 wt %, greater than or equal to about 10 wt %, greater than or equal to about 15 wt %. greater than or equal to about 25 wt %, greater than or equal to about 35 wt %, greater than or equal to about 50 wt %, greater than or equal to about 65 wt %, or greater than or equal to about 80 wt %. In some instances, the weight percentage of the glass fibers in the layer may be less than or equal to about 100 wt %, less than or equal to about 98 wt %, less than or equal to about 95 wt %, less than or equal to about 90 wt %, less than or equal to about 80 wt %, less than or equal to about 65 wt %, less than or equal to about 50 wt %, less than or equal to about 35 wt %, less than or equal to about 25 wt %, less than or equal to about 20 wt %, less than or equal to about 15 wt %, less than or equal to about 10 wt %, less than or equal to about 5 wt %, less than or equal to about 2 wt %, or less than or equal to about 1 wt %. Combinations of the above-referenced ranges are also possible (e.g., greater than or equal to about 0 wt % and less than or equal to about 10 wt %, greater than or equal to about 2 wt % and less than or equal to about 100 wt %). In some embodiments, weight percentage of the glass fibers may be less than or equal to about 5 wt. % (e.g., 0 wt. %). In other embodiments, weight percentage of the glass fibers may be greater than or equal to about 90 wt. % (e.g., 100 wt. %). Other values of weight percentage of the glass in a layer are also possible. In some embodiments, a layer or the filter media includes the above-noted ranges of glass fibers with respect to the total weight of fibers in the layer or filter media, respectively. In some embodiments, the above weight percentages are based on the weight of the total dry solids of the layer.

In some embodiments in which the second fiber web comprises non-continuous fibers, the second fiber web may comprise fibrillated fibers (e.g., fibrillated lyocell fibers, fibrillated acrylic fibers).

In some embodiments, the fibers in one or more layers (e.g., second fiber web, third fiber web) and/or the filter media may comprise fibrillated fibers. As known to those of ordinary skill in the art, a fibrillated fiber includes a parent fiber that branches into smaller diameter fibrils, which can, in some instances, branch further out into even smaller diameter fibrils with further branching also being possible. The branched nature of the fibrils leads to a high surface area and can increase the number of contact points between the fibrillated fibers and the fibers in the fiber web. Such an increase in points of contact between the fibrillated fibers and other fibers and/or components of the web may contribute to enhancing mechanical properties (e.g., flexibility, strength) and/or filtration performance properties of the fiber web.

Examples of fibrillated fibers, include, but are not limited to, fibrillated regenerated cellulose (e.g., rayon, Lyocell), microfibrillated cellulose, nanofibrillated cellulose, fibrillated synthetic fibers, including nanofibrillated synthetic fibers (e.g., fibrillated fibers formed of synthetic polymers such as polyester, polyamide, polyaramid, para-aramid, meta-aramid, polyimide, polyethylene, polypropylene, polyether ether ketone, polyethylene terephthalate, polyolefin, nylon, and/or acrylics), and fibrillated natural fibers (e.g., hardwood, softwood). Regardless of the type of fibrillated fibers, the weight percentage of fibrillated fibers in one or more layers (e.g., second fiber web, third fiber web) and/or the entire filter media may be greater than or equal to about 0 wt %, greater than or equal to about 1 wt %, greater than or equal to about 5 wt %, greater than or equal to about 10 wt %, greater than or equal to about 20 wt %, greater than or equal to about 30 wt %, greater than or equal to about 40 wt %, greater than or equal to about 50 wt %, greater than or equal to about 60 wt %, greater than or equal to about 70 wt %, or greater than or equal to about 80 wt %, e.g., based on the total weight of fibers in the layer or media. In some instances, the weight percentage of the fibrillated fibers in one or more layers and/or the entire filter media may be less than or equal to about 100 wt %, less than or equal to about 98 wt %, less than or equal to about 95 wt %, less than or equal to about 90 wt %, less than or equal to about 80 wt %, less than or equal to about 70 wt %, less than or equal to about 60 wt %, less than or equal to about 50 wt %, less than or equal to about 40 wt %, less than or equal to about 30 wt %, less than or equal to about 20 wt %, or less than or equal to about 10%, e.g., based on the total weight of fibers in the layer or media. Combinations of the above-referenced ranges are also possible (e.g., greater than or equal to about 0 wt %, and less than or equal to about 100 wt %, greater than or equal to about 0 wt %, and less than or equal to about 80 wt %). Other values of weight percentage of the fibrillated fibers in one or more layers and/or the entire filter media are also possible. In some embodiments, a layer or the filter media may include 0 wt % fibrillated fibers. In some embodiments, a layer (e.g., second fiber web, third fiber web) of the filter media may include greater than or equal to about 90 wt. % (e.g., 100 wt. %) fibrillated fibers. For instance, the second layer may comprise 100 wt. % fibrillated fibers. In some embodiments, a layer or the filter media includes the above-noted ranges of fibrillated fibers with respect to the total weight of fibers in the layer or filter media, respectively. In some embodiments, the above weight percentages are based on the weight of the total dry solids of the layer or filter media (including any resins).

In some embodiments the parent fibers may have an average diameter in the micron range. For example, the parent fibers may have an average diameter of greater than or equal to about 1 micron, greater than or equal to about 5 microns, greater than or equal to about 10 microns, greater than or equal to about 20 microns, greater than or equal to about 30 microns, greater than or equal to about 40 microns, greater than or equal to about 50 microns, greater than or equal to about 60 microns, or greater than or equal to about 70 microns. In some embodiments, the parent fibers may have an average diameter of less than or equal to about 75 microns, less than or equal to about 55 microns, less than or equal to about 35 microns, less than or equal to about 25 microns, less than or equal to about 15 microns, less than or equal to about 10 microns, or less than or equal to about 5 microns. Combinations of the above referenced ranges are also possible (e.g., parent fibers having an average diameter of greater than or equal to about 1 micron and less than or equal to about 25 microns). Other ranges are also possible.

In other embodiments, the parent fibers may have an average diameter in the nanometer range. For instance in, some embodiments, the parent fibers may have an average diameter of less than about 1 micron, less than or equal to about 0.8 microns, less than or equal to about 0.5 microns, less than or equal to about 0.1 microns, less than or equal to about 0.05 microns, less than or equal to about 0.02 microns, less than or equal to about 0.01 microns, or less than or equal to about 0.005 microns. In some embodiments, the parent fibers may have an average diameter of greater than or equal to about 0.003 microns, greater than or equal to about 0.004 micron, greater than or equal to about 0.01 microns, greater than or equal to about 0.05 microns, greater than or equal to about 0.1 microns, or greater than or equal to about 0.5 microns. Combinations of the above referenced ranges are also possible (e.g., parent fibers having an average diameter of greater than or equal to about 0.004 microns and less than about or equal to about 0.02 microns). Other ranges are also possible.

The average diameter of the fibrils is generally less than the average diameter of the parent fibers. Depending on the average diameter of the parent fibers, in some embodiments, the fibrils may have an average diameter of less than or equal to about 25 microns, less than or equal to about 20 microns, less than or equal to about 10 microns, less than or equal to about 5 microns, less than or equal to about 1 micron, less than or equal to about 0.5 microns, less than or equal to about 0.1 microns, less than or equal to about 0.05 microns, or less than or equal to about 0.01 microns. In some embodiments the fibrils may have an average diameter of greater than or equal to about 0.003 microns, greater than or equal to about 0.01 micron, greater than or equal to about 0.05 microns, greater than or equal to about 0.1 microns, greater than or equal to about 0.5 microns greater than or equal to about 1 micron, greater than or equal to about 5 microns, greater than or equal to about 10 microns, or greater than or equal to about 20 microns. Combinations of the above referenced ranges are also possible (e.g., fibrils having an average diameter of greater than or equal to about 0.01 microns and less than or equal to about 20 microns). Other ranges are also possible.

The level of fibrillation may be measured according to any number of suitable methods. For example, the level of fibrillation of the fibrillated fibers can be measured according to a Canadian Standard Freeness (CSF) test, specified by TAPPI test method T 227 om 09 (2009) Freeness of pulp. The test can provide an average CSF value.

In some embodiments, the average CSF value of the fibrillated fibers used in one or more layers may vary between about 5 mL and about 750 mL. In certain embodiments, the average CSF value of the fibrillated fibers used one or more layers may be greater than or equal to 1 mL, greater than or equal to about 10 mL, greater than or equal to about 20 mL, greater than or equal to about 35 mL, greater than or equal to about 45 mL, greater than or equal to about 50 mL, greater than or equal to about 65 mL, greater than or equal to about 70 mL, greater than or equal to about 75 mL, greater than or equal to about 80 mL, greater than or equal to about 100 mL, greater than or equal to about 150 mL, greater than or equal to about 175 mL, greater than or equal to about 200 mL, greater than or equal to about 250 mL, greater than or equal to about 300 mL, greater than or equal to about 350 mL, greater than or equal to about 500 mL, greater than or equal to about 600 mL, greater than or equal to about 650 mL, greater than or equal to about 700 mL, or greater than or equal to about 750 mL.

In some embodiments, the average CSF value of the fibrillated fibers used in one or more layers may be less than or equal to about 800 mL, less than or equal to about 750 mL, less than or equal to about 700 mL, less than or equal to about 650 mL, less than or equal to about 600 mL, less than or equal to about 550 mL, less than or equal to about 500 mL, less than or equal to about 450 mL, less than or equal to about 400 mL, less than or equal to about 350 mL, less than or equal to about 300 mL, less than or equal to about 250 mL, less than or equal to about 225 mL, less than or equal to about 200 mL, less than or equal to about 150 mL, less than or equal to about 100 mL, less than or equal to about 90 mL, less than or equal to about 85 mL, less than or equal to about 70 mL, less than or equal to about 50 mL, less than or equal to about 40 mL, less than or equal to about 25 mL, less than or equal to about 10 mL, or less than or equal to about 5 mL. Combinations of the above-referenced ranges are also possible (e.g., greater than or equal to about 10 mL and less than or equal to about 300 mL). Other ranges are also possible. The average CSF value of the fibrillated fibers used in one or more layers may be based on one type of fibrillated fiber or more than one type of fibrillated fiber.

In some embodiments, one or more fiber webs and/or the entire filter media, in addition to a plurality of fibers, may also include other components, such as a resin, surface treatments, and/or additives. In general, any suitable resin may be used to achieve the desired properties. For example, the resin may be polymeric, water-based, solvent-based, dry strength, and/or wet strength. Typically, any additional components are present in limited amounts.

In some embodiments, at least a portion of the fibers of one or more fiber web may be coated with a resin without substantially blocking the pores of the fiber web. In some embodiments, one or more fiber webs or the entire filter media described herein include a resin.

In some embodiments, the resin may be a binder resin. The binder resin is not in fiber form and is to be distinguished from binder fiber (e.g., multi-component fiber) described above. In general, the binder resin may have any suitable composition. For example, the binder resin may comprise a thermoplastic (e.g., acrylic, polyvinylacetate, polyester, polyamide), a thermoset (e.g., epoxy, phenolic resin), or a combination thereof. In some cases, a binder resin includes one or more of a vinyl acetate resin, an epoxy resin, a polyester resin, a copolyester resin, a polyvinyl alcohol resin, an acrylic resin such as a styrene acrylic resin, and a phenolic resin. Other resins are also possible.

As described further below, the resin may be added to the fibers in any suitable manner including, for example, in the wet state. In some embodiments, the resin coats the fibers and is used to adhere fibers to each other to facilitate adhesion between the fibers. Any suitable method and equipment may be used to coat the fibers, for example, using curtain coating, gravure coating, melt coating, dip coating, knife roll coating, or spin coating, amongst others. In some embodiments, the binder is precipitated when added to the fiber blend. When appropriate, any suitable precipitating agent (e.g., Epichlorohydrin, fluorocarbon) may be provided to the fibers, for example, by injection into the blend. In some embodiments, upon addition to the fibers, the resin is added in a manner such that one or more fiber web or the entire filter media is impregnated with the resin (e.g., the resin permeates throughout). In a multi-fiber web, a resin may be added to each of the fiber webs separately prior to combining the fiber webs, or the resin may be added to the fiber web after combining the fiber webs. In some embodiments, resin is added to the fibers while in a dry state, for example, by spraying or saturation impregnation, or any of the above methods. In other embodiments, a resin is added to a wet fiber web.

Filter media described herein may be produced using suitable processes, such as using a non-wet laid or a wet laid process. In some embodiments, a fiber web and/or the filter media described herein may be produced using a non-wet laid process, such as blowing or spinning process. In some embodiments, a fiber web (e.g., first fiber web, second fiber web) and/or the entire filter media may be formed by an electrospinning process. In some embodiments, electrospinning utilizes a high voltage differential to generate a fine jet of polymer solution from bulk polymer solution. The jet forms as the polymer is charged by the potential and electrostatic repulsion forces overcome the surface tension of the solution. The jet gets drawn into a fine fiber under the effect of repulsive electrical forces applied to the solution. The jet dries in flight and is collected on a grounded collector. The rapid solvent evaporation during this process leads to the formation of polymeric nanofiber which are randomly arranged into a web. In some embodiments, electrospun fibers are made using non-melt fiberization processes. Electrospun fibers can be made with any suitable polymers including but not limiting to, organic polymers, inorganic material (e.g., silica), hybrid polymers, and any combination thereof. In some embodiments, the synthetic fibers, described herein, may be formed from an electrospinning process.

In certain embodiments, a fiber web (e.g., first fiber web, second fiber web) and/or the entire filter media may be formed by a meltblowing system, such as the meltblown system described in U.S. Publication No. 2009/0120048, filed Nov. 7, 2008, and entitled "Meltblown Filter Medium", and U.S. Publication No. 2012-0152824, filed Dec. 17, 2010, and entitled, "Fine Fiber Filter Media and Processes", each of which is incorporated herein by reference in its entirety for all purposes. In certain embodiments, a fiber web (e.g., first fiber web, second fiber web) and/or the entire filter media may be formed by a meltspinning or a centrifugal spinning process.

In some embodiments, a non-wet laid process, such as an air laid or carding process, may be used to form one or more fiber webs. For example, in an air laid process, synthetic fibers may be mixed, while air is blown onto a conveyor. In a carding process, in some embodiments, the fibers are manipulated by rollers and extensions (e.g., hooks, needles) associated with the rollers. In some cases, forming the fiber webs through a non-wet laid process may be more suitable for the production of a highly porous media. In some embodiments, a non-wet laid process (e.g., electrospun, meltblown) may be used to form the first fiber web and a wet laid process may be used to form the second fiber web. The first fiber web and the second fiber web may be combined using any suitable process (e.g., lamination, calendering, smooth roll calendering).

In some embodiments, a fiber web and/or the filter media described herein may be produced using a wet laid process. In general, a wet laid process involves mixing together of fibers of one or more type; for example, polymeric staple fibers of one type may be mixed together with polymeric staple fibers of another type, and/or with fibers of a different type (e.g., synthetic fibers and/or glass fibers), to provide a fiber slurry. The slurry may be, for example, an aqueous-based slurry. In certain embodiments, fibers, are optionally stored separately, or in combination, in various holding tanks prior to being mixed together (e.g., to achieve a greater degree of uniformity in the mixture).

During or after formation of a filter media, the filter media may be further processed according to a variety of known techniques. For instance, a coating method may be used to include a resin in the filter media. Optionally, additional fiber webs can be formed and/or added to a filter media using processes such as lamination, co-pleating, or collation. For example, in some cases, two fiber webs (e.g., first fiber web and the second fiber web) are formed into a composite article by a wet laid process as described above, and the composite article is then combined with a third fiber web by any suitable process (e.g., lamination, co-pleating, or collation). It can be appreciated that a filter media or a composite article formed by the processes described herein may be suitably tailored not only based on the components of each fiber web, but also according to the effect of using multiple fiber webs of varying properties in appropriate combination to form filter media having the characteristics described herein.

As described herein, in some embodiments two or more fiber webs of the filter media (e.g., first fiber web and the third fiber web) may be formed separately and bonded by any suitable method such as lamination, collation, or by use of adhesives. The two or more fiber webs may be formed using different processes, or the same process. For example, each of the fiber webs may be independently formed by a non-wet laid process (e.g., meltblown process, melt spinning process, centrifugal spinning process, electrospinning process, dry laid process, air laid process), a wet laid process, or any other suitable process.

Different fiber webs may be adhered together by any suitable method. For instance, fiber webs may be adhered using compressive techniques (e.g., lamination). Fiber webs may also be adhered by chemical bonding, adhesive and/or melt-bonded to one another on either side.

Lamination may involve, for example, compressing two or more fiber webs (e.g., first and second fiber webs) together using a flatbed laminator or any other suitable device at a particular pressure and temperature for a certain residence time (i.e., the amount of time spent under pressure and heat). For instance, the pressure may be between about 40 psi to about 60 psi (e.g., between about 40 psi to about 55 psi, between about 40 psi to about 50 psi, between about 45 psi to about 55 psi, between about 45 and 60 psi, between about 50 psi and about 60 psi); the temperature may be between about 100° C. and about 200° C. (e.g., between about 100° C. and about 175° C., between about 100° C. and about 150° C., or between about 100° C. and about 125° C., between about 125° C. and about 200° C., between about 150° C. and about 200° C., between about 175° C. and about 200° C.); the residence time between about 1 second to about 60 seconds (e.g., between about 1 second to about 30 seconds, between about 10 second to about 25 seconds, or between about 20 seconds and about 40 seconds); and/or the line speed between about 5 m/min and about 20 m/min (e.g., between about 8 m/min and about 20 m/min, between about 10 m/min and about 20 m/min, between about 12 m/min and about 20 m/min, between about 15 m/min and about 20 m/min, between about 5 m/min and about 18 m/min, between about 5 m/min and about 15 m/min, between about 5 m/min and about 12 m/min, between about 5 m/min and about 10 m/min). Other ranges for pressure, temperature, and residence time are also possible.

In some embodiments, the filter media may include a first fiber web formed via an electrospinning process adhered (e.g., adhesively) to a second fiber web formed via another process (e.g., meltblowing process). For instance, the first fiber web (e.g., electrospun fiber web) may be adhesively bound to a second fiber web (e.g., meltblown fiber web). Non-limiting example of suitable adhesive include acrylic copolymers, ethyl vinyl acetate (EVA), copolyesters, polyolefins, polyamides, polyurethanes, styrene block copolymers, thermoplastic elastomers, polycarbonates, silicones, and combinations thereof. Adhesives can be applied using different methods, such as spray coating (e.g., solution spraying if solvent or water based adhesives are used or melt spraying if hot melt adhesive is used), dip coating, kiss roll, knife coating, and gravure coating. In some embodiments, a first fiber web (e.g., electrospun fiber web) and a second fiber web (e.g., meltblown fiber web) may be adhesively bound using a polymeric adhesive (e.g., acrylic copolymer) applied via spray coating. For example, an electrospun fiber web (e.g., comprising nylon fibers) and a meltblown fiber web (e.g., comprising polypropylene fibers) may be adhesively bound using a polymeric adhesive (e.g., acrylic copolymer) applied via spray coating.

In some embodiments, at least a portion of a surface of the first fiber web may be bonded (e.g., via lamination, via adhesive) to a third fiber web formed via a meltblowing, wetlaid, air laid, force spinning, electrospinning, or electroblowing process. In some cases, the third fiber web may be bonded to a surface of the first fiber web to form the filter media. In some embodiments, the bonding process does not significantly change the pore characteristics of the first fiber web. For instance, one or more pore properties (e.g., maximum pore size, full width at half maximum, mean flow pore size, ratio of maximum pore size to mean flow pore size) of the filter media may be within about 0% (no change) to 100% (100% change) of the value of the same pore property of the first fiber web prior to the bonding step, or in some embodiments within 0% to 50% (e.g., within 0% to 25%, within 0% to 10%) of the value of the same pore property of the first fiber web prior to the bonding step. As an example, a first fiber web adjacent to a second fiber web, described herein, may have a maximum pore size of greater than or equal to about 0.1 microns and less than or equal to about 1.0 micron and a ratio of maximum pore size to mean pore size of less than or equal to about 2.5 prior to the bonding step. The filter media may have a maximum pore size and/or a ratio of maximum pore size to mean pore size that is within about 50% of the maximum pore size and/or a ratio of maximum pore size to mean pore size of the first fiber web prior to the bonding step.

As described herein, in some embodiments, the second fiber web and/or support layer may be calendered. In general, the second fiber web is calendered prior to contact with another fiber web (e.g., first fiber web). For example, first fiber web may be formed on a calendered second fiber web. In such cases, the first fiber web is uncalendered and the second fiber web is calendered. In some embodiments, the support layer (e.g., second fiber web and fourth fiber web) is calendered prior to contact with another fiber web (e.g., first fiber web). For instance, in embodiments in which the support layer comprises two or more fiber webs as described above with respect to FIG. 1C, the support layer may comprise two or more calendered fiber webs. For example, the support layer may comprise a meltblown fiber web and a spunbond fiber web that are calendered prior to formation of the first fiber web on the meltblown fiber web.

The calendering process may involve compressing one or more fiber webs (e.g., second fiber web, second and fourth fiber webs) using calender rolls under a particular pressure, temperature, and line speed. For instance, the pressure may be between about 500 psi to about 800 psi (e.g., between about 550 psi to about 750 psi, between about 550 psi to about 700 psi, between about 550 psi to about 650 psi, between about 550 and 600 psi, between about 600 psi and about 750 psi, between about 600 psi and about 700 psi, between about 650 psi and about 750 psi, between about 700 psi and about 750 psi); the temperature may be between about 40° C. and about 120° C. (e.g., between about 40° C. and about 85° C., between about 50° C. and about 85° C., between about 60° C. and about 85° C., between about 65° C. and about 75° C., between about 70° C. and about 85° C., between about 35° C. and about 80° C., between about 35° C. and about 70° C., between about 35° C. and about 60° C., between about 35° C. and about 50° C.); and/or the line speed may be between about 5 ft/min to about 100 ft/min (e.g., between about 5 ft/min to about 80 ft/min, between about 10 ft/min to about 50 ft/min, between about 15 ft/min to about 100 ft/min, between about 15 ft/min to about 25 ft/min, or between about 20 ft/min to about 90 ft/min). Other ranges for pressure, temperature, and line speed are also possible.

In some embodiments, further processing may involve pleating the filter media. For instance, two fiber webs may be joined by a co-pleating process. In some cases, the filter media, or various fiber webs thereof, may be suitably pleated by forming score lines at appropriately spaced distances apart from one another, allowing the filter media to be folded. In some cases, one fiber web can be wrapped around a pleated fiber web. It should be appreciated that any suitable pleating technique may be used.

In some embodiments, a filter media can be post-processed such as subjected to a corrugation process to increase surface area within the web. In other embodiments, a filter media may be embossed.

In some embodiments, a fiber web, a layer, and/or a filter media described herein is not embossed.

The filter media may include any suitable number of fiber webs, e.g., at least 2, at least 3, at least 4, at least 5, at least 6, at least 7 fiber webs. In some embodiments, the filter media may include up to 20 fiber webs.

In some embodiments, a fiber web described herein may be a non-woven web. A non-woven web may include non-oriented fibers (e.g., a random arrangement of fibers within the web). Examples of non-woven webs include webs made by wet-laid or non-wet laid processes as described herein. Non-woven webs also include papers such as cellulose-based webs.

Filter media described herein may be used in an overall filtration arrangement or filter element. In some such embodiments, one or more additional fiber webs or components are included with the filter media. It should be appreciated that the filter media may include other parts in addition to the one or more fiber webs described herein. In some embodiments, further processing includes incorporation of one or more structural features and/or stiffening elements. For instance, the filter media may be combined with additional structural features such as polymeric and/or metallic meshes. In one embodiment, a screen backing may be disposed on the filter media, providing for further stiffness. In some cases, a screen backing may aid in retaining the pleated configuration. For example, a screen backing may be an expanded metal wire or an extruded plastic mesh.

In some embodiments, filter media can be incorporated into a variety of filter elements for use in various filtering applications. Exemplary types of filters include bioprocessing filters, chemical processing filters, industrial processing filters, medical filters (e.g., filters for blood), vent filters, air filters, and water filters. The filter media may be suitable for filtering gases or liquids. The water and/or air filters may be used for the removal of microorganisms, virus particles, and/or other contaminants. For instance, filter media suitable for water filtration may be used for the treatment of municipal water, residential water, and/or industrial water (e.g., mining water, cooling tower/boiler's water, nuclear water, ultra-pure water production for the semiconductor and biopharmaceutical industries).

Filter elements can also be in any suitable form, such as pleated filter, capsules, spiral wound elements, plate and frame devices, flat sheet modules, vessel bags, disc tube units, radial filter elements, panel filter elements, or channel flow elements. A radial filter element can include pleated filter media that are constrained within two open wire meshes in a cylindrical shape. During use, fluids can flow from the outside through the pleated media to the inside of the radial element.

In some cases, the filter element includes a housing that may be disposed around the filter media. The housing can have various configurations, with the configurations varying based on the intended application. In some embodiments, the housing may be formed of a frame that is disposed around the perimeter of the filter media. For example, the frame may be thermally sealed around the perimeter. In some cases, the frame has a generally rectangular configuration surrounding all four sides of a generally rectangular filter media. The frame may be formed from various materials, including for example, metal, polymers, or any combination of suitable materials. The filter elements may also include a variety of other features known in the art, such as stabilizing features for stabilizing the filter media relative to the frame, spacers, or any other appropriate feature.

The filter elements may have one or more properties that has substantially the same or improved values as those noted above in connection with the filter media. For example, the above-noted water permeability, filtration efficiency, maximum pore size, mean pore size, and/or pore size distribution may also be found in filter elements. In some embodiments, cartridge elements (e.g., standard 10" elements) are provided.

In some embodiments, a cartridge element comprises a filter media. In some embodiments, the filter media is pleated, having a pleat height of between or equal to 0.1 cm and 10 cm (e.g., between or equal to 0.5 cm and 2 cm, e.g., 1.27 cm). In some embodiments, a cartridge element further comprises one or more scrim layers (e.g., two, three, or more scrim layers) adjacent to the filter media. In some embodiments, the filter media and the one or more scrim layers (e.g., pleated together) are configured together as an open-ended cylinder. In some embodiments, the cartridge element further comprises a cartridge housing in which the filter media and/or one or more scrim layers is located, e.g., having sealed end caps enclosing the filter media and/or one or more scrim layers.

In some embodiments, a method of making a cartridge element is provided. In some embodiments, the method comprises feeding a filter media described herein, in roll format together with a layer of scrim (e.g., polypropylene scrim) on the upstream and two layers of scrim (e.g., polypropylene scrim) on the downstream side, to a blade pleater to create 1.27 cm pleat height across the media and the scrim layers. In some embodiments, the method further comprises cutting the pleated scrim-supported media to an appropriate length and seaming the media, e.g., to form an open-ended cylinder. In some embodiments, the method further comprises inserting the pleated media cylinder into a cartridge housing and enclosing the cylinder, e.g., by means of heat sealing the end caps of the housing.

In some embodiments, the filter element (e.g., cartridge element) may still have a relatively high particulate efficiency. For instance, in some embodiments, the particulate efficiency for particles 0.45 microns in size or greater may be greater than or equal to about 98%, greater than or equal to about 98.5%, greater than or equal to about 99%, greater than or equal to about 99.5%, greater than or equal to about 99.9%, or greater than or equal to about 99.99%. In some instances, the filter element may have a particulate efficiency of less than 100%, less than or equal to about 99.99%, less than or equal to about 99.9%, or less than or equal to about 99%. Combinations of the above referenced ranges are also possible (e.g., greater than or equal to about 98% and less than 100%, greater than or equal to about 98% and less than or equal to about 99.99%, greater than or equal to about 99% and less than or equal to about 99.9%). The particulate efficiency may be measured, e.g., for a filter element (e.g., cartridge element), according to IFTS method IFTS-FEEEIS-01:2013, monitoring particles 0.45 microns in size. The efficiency may be measured as described above except that the flow rate of a challenge solution may differ between flatsheet filter media and cartridge elements. In the case of flatsheet filter media, in some cases, a flow rate of a challenge solution may be 1 L/min, whereas a flow rate of a challenge solution for a cartridge element may be 15 L/min.

In some embodiments, the filter element may still have a relatively high particulate efficiency. For instance, in some embodiments, the particulate efficiency for particles 0.3 microns in size or greater may be greater than or equal to about 98%, greater than or equal to about 98.5%, greater than or equal to about 99%, greater than or equal to about 99.5%, greater than or equal to about 99.9%, or greater than or equal to about 99.99%. In some instances, the filter element may have a particulate efficiency of less than 100%, less than or equal to about 99.99%, less than or equal to about 99.9%, or less than or equal to about 99%. Combinations of the above referenced ranges are also possible (e.g., greater than or equal to about 98% and less than 100%, greater than or equal to about 98% and less than or equal to about 99.99%, greater than or equal to about 99% and less than or equal to about 99.9%). The particulate efficiency may be measured, e.g., for a filter element (e.g., cartridge element), according to IFTS method IFTS-FEEEIS-01:2013, monitoring particles 0.3 microns in size.

In some embodiments, the filter element may still have a relatively high particulate efficiency. For instance, in some embodiments, the particulate efficiency for particles 0.2 microns in size or greater may be greater than or equal to about 90%, greater than or equal to about 92%, greater than or equal to about 95%, greater than or equal to about 98%, greater than or equal to about 99%, greater than or equal to about 99.9%, or greater than or equal to about 99.99%. In some instances, the filter element may have a particulate efficiency of less than 100%, less than or equal to about 99.99%, less than or equal to about 99.9%, less than or equal to about 99%, less than or equal to about 97%, or less than or equal to about 95%. Combinations of the above referenced ranges are also possible (e.g., greater than or equal to about 90% and less than 100%, greater than or equal to about 90% and less than or equal to about 99.99%, greater than or equal to about 90% and less than or equal to about 99.9%). The particulate efficiency may be measured, e.g., for a filter element (e.g., cartridge element), according to IFTS method IFTS-FEEEIS-01:2013, monitoring particles 0.2 microns in size.

In some embodiments, the dirt holding capacity of the filter element may be greater than or equal to about 60 mg/cm$^2$, greater than or equal to about 65 mg/cm$^2$, greater than or equal to about 70 mg/cm$^2$, greater than or equal to about 75 mg/cm$^2$, greater than or equal to about 80 mg/cm$^2$, greater than or equal to about 85 mg/cm$^2$, greater than or equal to about 90 mg/cm$^2$, or greater than or equal to about 95 mg/cm$^2$. In some instances, the dirt holding capacity of the filter element may be less than or equal to about 100 mg/cm$^2$, less than or equal to about 95 mg/cm$^2$, less than or equal to about 90 mg/cm$^2$, less than or equal to about 85 mg/cm$^2$, less than or equal to about 80 mg/cm$^2$, less than or equal to about 75 mg/cm$^2$, less than or equal to about 70 mg/cm$^2$, less than or equal to about 65 mg/cm$^2$, less than or equal to about 64 mg/cm$^2$, or less than or equal to about 62 mg/cm$^2$. Combinations of the above-referenced ranges are also possible (e.g., greater than or equal to about 60 mg/cm$^2$ and less than or equal to about 100 mg/cm$^2$, greater than or equal to about 64 mg/cm$^2$ and less than or equal to about 75 mg/cm$^2$). Other values are also possible. The dirt holding capacity may be determined by using a modified version of EN-13443-2 (2005) using iso-fine test dust as described above except that (similar to the efficiency test) the flow rate of challenge solution may differ between flatsheet and cartridge elements. In the case of flatsheet, in some cases, a flow rate of a challenge solution may be 1 L/min (face velocity of 10.5 cm/min) whereas a flow rate of a challenge solution for a cartridge element may be 15 L/min (face velocity of approximately 2.5 cm/min).

In some embodiments, the pressure drop across the filter element at a flow rate of 15 liters per minute may be relatively low. For instance, in some embodiments, the pressure drop across the filter element may less than or equal to about 5 kPa, less than or equal to about 4.8 kPa, less than or equal to about 4.5 kPa, less than or equal to about 4.2 kPa, less than or equal to about 4 kPa, less than or equal to about 3.8 kPa, less than or equal to about 3.5 kPa, less than or equal to about 3.2 kPa, less than or equal to about 3 kPa, less than or equal to about 2.8 kPa, less than or equal to about 2.5 kPa, less than or equal to about 2 kPa, less than or equal to about 1.5 kPa, or less than or equal to about 1.5 kPa. In some instances, the filter element may have a pressure drop of greater than or equal to about 1 kPa, greater than or equal to about 1.2 kPa, greater than or equal to about 1.5 kPa, greater than or equal to about 1.8 kPa, greater than or equal to about 2 kPa, greater than or equal to about 2.2 kPa, greater than or equal to about 2.5 kPa, greater than or equal to about 2.8 kPa, greater than or equal to about 3 kPa, greater than or equal to about 3.2 kPa, greater than or equal to about 3.5 kPa, greater than or equal to about 3.8 kPa, or greater than or equal to about 4 kPa. Combinations of the above-referenced ranges are also possible (e.g., greater than or equal to about 1 kPa and less than or equal to about 5 kPa, greater than or equal to about 1.5 kPa and less than or equal to about 4.5 kPa). Other values of pressure drop are also possible. The filter element pressure drop can be measured using the standard NF X 45-302:2000. The pressure drop was measured using 18 MegaOhm-cm deionized water with a flow rate of 15 liters per minute through the filter media.

In some embodiments, the pressure drop across the filter element at a flow rate of 20 liters per minute may be relatively low. For instance, in some embodiments, the pressure drop across the non-woven web may less than or equal to about 7 kPa, less than or equal to about 6.8 kPa, less than or equal to about 6.5 kPa, less than or equal to about 6.2 kPa, less than or equal to about 6 kPa, less than or equal to about 5.8 kPa, less than or equal to about 5.5 kPa, less than or equal to about 5.2 kPa, less than or equal to about 5 kPa, less than or equal to about 4.8 kPa, less than or equal to about 4.5 kPa, less than or equal to about 4.2 kPa, less than or equal to about 4 kPa, less than or equal to about 3.8 kPa, less than or equal to about 3.5 kPa, less than or equal to about 3.2 kPa, less than or equal to about 3 kPa, or less than or equal to about 2.8 kPa. In some instances, the filter element may have a pressure drop of greater than or equal to about 2.5 kPa, greater than or equal to about 2.8 kPa, greater than or equal to about 3 kPa, greater than or equal to about 3.2 kPa, greater than or equal to about 3.5 kPa, greater than or equal to about 3.8 kPa, greater than or equal to about 4 kPa, greater than or equal to about 4.2 kPa, greater than or equal to about 4.5 kPa, greater than or equal to about 4.8 kPa, greater than or equal to about 5 kPa, greater than or equal to about 5.2 kPa, greater than or equal to about 5.5 kPa, greater than or equal to about 5.8 kPa, or greater than or equal to about 6 kPa. Combinations of the above-referenced ranges are also possible (e.g., greater than or equal to about 2.5 kPa and less than or equal to about 7 kPa, greater than or equal to about 3 kPa and less than or equal to about 6.5 kPa). Other values of pressure drop are also possible. The filter element pressure drop can be measured using the NF X 45-302:2000. The pressure drop was measured using 18 MegaOhm-cm deionized water with a flow rate of 20 liters per minute through the filter media.

During use, the filter media mechanically trap contaminant particles on the filter media as fluid (e.g., water) flows through the filter media. The filter media need not be electrically charged to enhance trapping of contamination. Thus, in some embodiments, the filter media are not electrically charged. However, in some embodiments, the filter media may be electrically charged. Charging of such filter media might be performed by means of coating the media with ionic polymer.

Example 1

This example describes the structural characteristics of a calendered fiber web and an uncalendered fiber web. The calendered fiber web had a lower thickness, mean pore size, tensile elongation, and surface mean pore area as well as a higher number of fiber intersections per unit area (a higher intersection density) compared to the uncalendered fiber web.

Figure 2A:
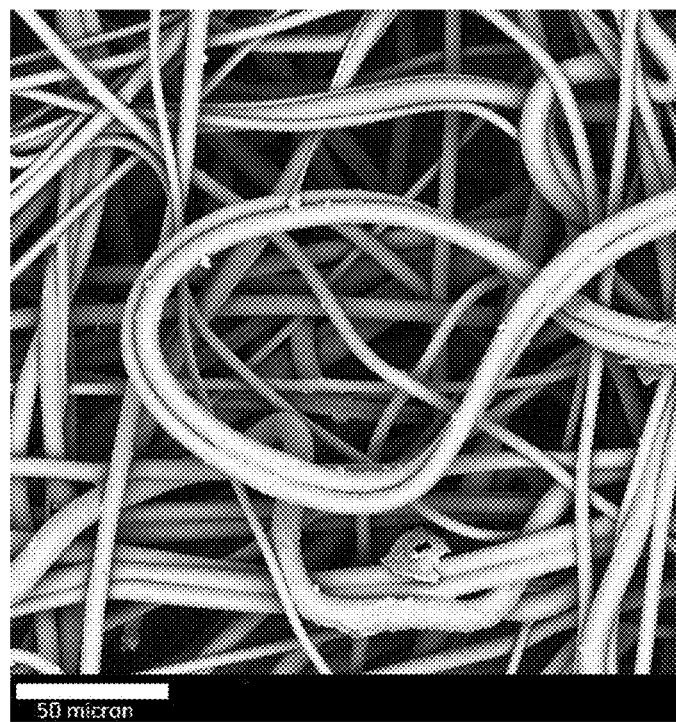
FIG. 2A is a scanning electron microscopy (SEM) image of an uncalendered fiber web according to certain embodiments.
Figure 2B:
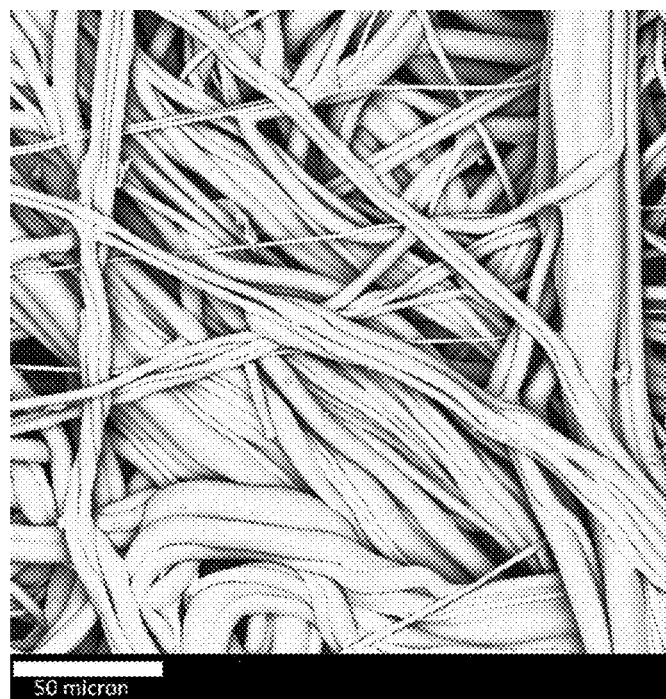
FIG. 2B is an SEM image of a calendered fiber web according to certain embodiments.
Figure 3A:
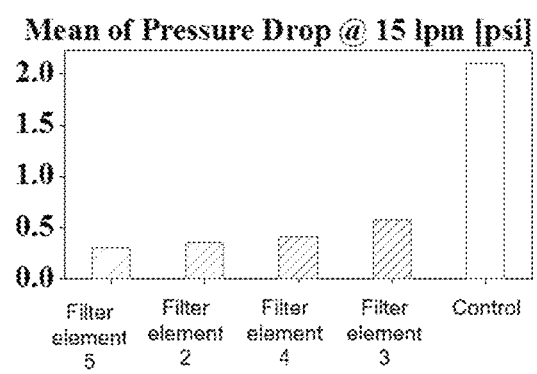
FIGS. 3A-3D show plots of (A) average (mean) pressure drop at 15 liters per minute (lpm), (B) mean 0.2 micron particle efficiency, (C) mean dust holding capacity (DHC) at 2 bar, and (D) mean 0.3 micron particle efficiency of various filter media, according to certain embodiments.
Figure 3B:
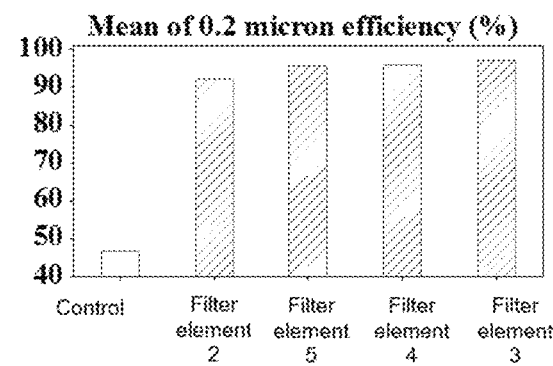
Figure 3C:
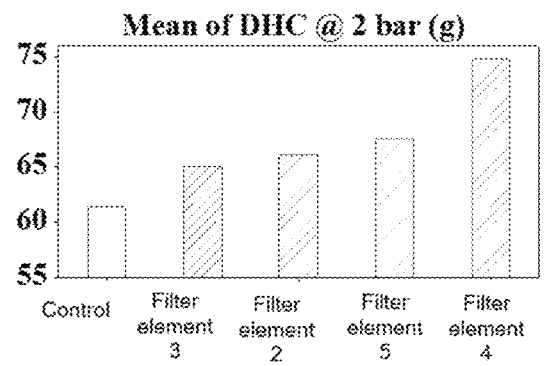
Figure 3D:
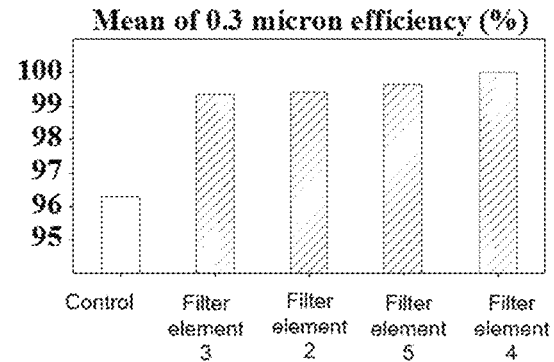

Briefly, two meltblown fiber webs consisting of nylon 6 fibers having an average diameter of 4 μm were formed by substantially the same process. One of the meltblown fiber webs was calendered. The meltblown fiber web was calendered at a temperature 343.333° C., a pressure of 1.103161*10$^6$ Pa, and at a line speed of 6.096 m/min. Prior to calendering, the two meltblown fiber webs had substantially the same properties. FIG. 2A is a scanning electron microscopy (SEM) image (micrograph) of the uncalendered fiber web and FIG. 2B is an SEM image of the calendered fiber web. Table 1 shows the structural properties of the fiber webs. Regarding Table 1: Air permeability (Air perm); Mean flow pore size (MFP); Maximum pore size (Max pore); for thickness, 1 mil=0.0254 mm; machine direction (MD); 1 lb/in=175.127 N/m; 1 CFM=0.00047195 m$^3$/s.

TABLE 1

Properties of Uncalendered and Calendered Fiber Webs

| Meltblown Fiber Web | Basis Weight (g/m$^2$) | Thickness (mil) | Air Perm (CFM) at 125 Pa | MFP (μm) | Max Pore (μm) | Surface Mean Pore Area (μm$^2$) | Intersection Density (Ints/μm$^2$) | Tensile lb/in (MD) | Elongation % (MD) |
|---|---|---|---|---|---|---|---|---|---|
| Uncalendered | 23 | 5.5 | 180.8 | 20.2 | 42.2 | 65 | 0.0037 | 2.3 | 62.9 |
| Calendered | 22 | 3 | 93 | 14 | 43 | 13 | 0.012 | 2.5 | 27 |

The calendered meltblown fiber web (e.g., FIG. 2B) had a higher solidity, smaller surface mean pore area, more fiber intersections per unit area, and a smoother surface than the uncalendered fiber web (e.g., FIG. 2A).

Surface mean pore area was measured through scanning electron microscopy analysis using DiameterJ, a plug-in for the ImageJ image analysis software. A Phenom desktop scanning electron microscope was used to generate the micrographs. The micrographs were taken at a magnification of 1200×. The electron acceleration voltage was 10 kV and backscattered electrons were used to create the micrographs. The cumulative area of all pores in a micrograph was determined by converting the micrograph to a black-and-white image and calculating the area of the black pixels (representing at least a portion of a pore). Surface mean pore area was calculated by dividing the cumulative pore area by the number of pores analyzed. Solidity was estimated from the SEM images by subtracting the cumulative pore area from the total area of the image and dividing the difference by the total area of the image, multiplying the result by 100 for a solidity percentage.

The number of fiber intersections per micron squared was measured through scanning electron microscopy analysis using DiameterJ. A Phenom desktop scanning electron microscope was used to generate the micrographs. The micrographs were taken at a magnification of 1200×. The electron acceleration voltage was 10 kV and backscattered electrons were used to create the micrographs. The total number of intersections between fibers at the surface of the layer was determined by counting the intersections in a micrograph and dividing the number by the area covered by the micrograph.

In addition, the calendered fiber web had a smaller mean flow pore size, thickness, and tensile elongation than the uncalendered fiber web.

Example 2

This example describes the structural and filtration properties of a flatsheet filter media including an efficiency layer formed on a calendered support layer and a flatsheet filter media including an efficiency layer formed on an uncalendered support layer. The filter media including the calendered support layer had better thickness and pore characteristics than the filter media including an uncalendered support layer.

The filter media were formed by electro spinning a fiber web onto an uncalendered or calendered meltblown fiber web and laminating a second meltblown fiber web to the electrospun web. Lamination was performed with a flatbed laminator at a temperature of 140.556° C., a pressure of 55 psi (1 psi=6894.756 Pa), and a line speed of 30 feet/min (1 foot=0.3048 m; 1 foot=12 inches (in)). All fiber webs contained nylon fibers. The second meltblown fiber web in filter media 1 and 2 differed only with respect to basis weight.

Filter media 1 included an uncalendered meltblown fiber web having a basis weight of 30 g/m$^2$, an electrospun fiber web having a basis weight of 3 g/m$^2$ and an average fiber diameter of 120 nm, and a second (uncalendered) meltblown fiber web having a basis weight of 30 g/m$^2$. The uncalendered meltblown fiber webs had a basis weight of 30 g/m$^2$, a mean flow pore size of 24 micron, max pore size of 55 micron, tensile strength of 2.6 lb/in (1 lb/in=175.127 N/m), a tensile elongation of 95.6%, a surface mean pore area of 65 μm$^2$, an intersection density of 0.0037 ints/μm$^2$, and a thickness of 6.5 mil.

Filter media 2 included a calendered meltblown fiber web having a basis weight of 23 g/m$^2$, an electrospun fiber web having a basis weight of 1.6 g/m$^2$ and an average fiber diameter of 120 nm, and a (uncalendered) meltblown fiber web having a basis weight of 23 g/m$^2$. The uncalendered meltblown fiber web had a basis weight of 23 g/m$^2$, a mean flow pore size of 20 micron, max pore size of 42 micron, tensile strength of 2.3 lb/in, a tensile elongation of 63%, a surface mean pore area of 65 μm$^2$, an intersection density of 0.0037 ints/μm$^2$, and a thickness of 5.5 mil. The calendered meltblown fiber web had a basis weight of 23 g/m$^2$, a mean flow pore size of 15 micron, max pore size of 45 micron, tensile strength of 2.5 lb/in, a tensile elongation of 45%, a surface mean pore area of 13 μm$^2$, an intersection density of 0.012 ints/μm$^2$, and a thickness of 3 mil. In Filter media 2, the structure was asymmetric: the support layer was calendered and had different properties than the third fiber web. Table 2 shows the structural and filtration properties of the filter media. Microns=μm.

TABLE 2

Properties of the Filter Media

| Filter media | Basis weight (g/m²) | Thickness (mil) | Air Perm (CFM) at 2500 Pa | Water perm (ml/min · cm² · psi) | MFP (μm) | Max Pore (μm) | Max Pore/MFP |
|---|---|---|---|---|---|---|---|
| Filter media 1 | 62.5 | 9.4 | 10.5 | 2.6 | 0.16 | 2.4 | 15 |
| Filter media 2 | 48 | 5.6 | 30 | 5.2 | 0.28 | 0.6 | 2.14 |

The weight of the support layer and cover layer were each around 23 gsm (g/m²). This was about 46 gsm total, plus 1.6 gsm of fine fiber (nanofiber web): 47.6 gsm, which was rounded to 48 gsm in Table 2.

As noted above, the electrospun fiber web in filter media 1 had a greater basis weight than the electrospun fiber web in filter media 2. It was found that even at higher basis weight of nanofiber, the maximum (max) pore size was much larger on an uncalendered support layer than on a calendered support layer.

As shown in Table 2, filter media 2 had a more homogeneous pore structure than filter media 1 and a higher water permeability. The ratio of maximum pore size to mean pore size for filter media 2 was seven times smaller than the ratio for filter media 1.

In certain embodiments, the electrospinning process was the rate-limiting step in the process of forming a filter media as described herein. Without being bound by theory, by reducing the required mass of fibers, one can increase the speed of the electrospinning process, thus increasing the overall throughput of the process of forming a filter media. Without being bound by theory, using a calendered support layer not only allows a smaller amount of nanofiber to be used in the electrospun layer, but also facilitates the production of a filter media that outperforms filter media having a support layer without the properties of the calendered support layer.

Example 3

This example describes the structural and filtration properties of a flatsheet filter media including an efficiency layer formed on a calendered meltblown support layer and a flatsheet filter media including an efficiency layer formed on a calendered scrim/meltblown support layer. The filter media including the calendered meltblown support layer had a more homogeneous pore structure than the filter media including the calendered scrim/meltblown support layer.

The filter media were formed by electrospinning a fiber web onto a calendered meltblown fiber web or a calendered scrim/meltblown support layer and laminating a second meltblown fiber web to the electrospun web. Lamination was performed with a flatbed laminator at a temperature of 140.556° C., a pressure of 55 psi (1 psi=6894.756 Pa), and a line speed of 30 feet/min (1 foot=0.3048 m; 1 foot=12 inches (in)). All fiber webs contained nylon fibers. Filter media 2 included a calendered meltblown support layer and was formed as described in Example 2. Filter media 3 included a different support layer, the support layer including a nylon spunbond scrim layer and a thin layer (10 gsm) (gsm=g/m²) of meltblown (e.g., comprising nylon 6) calendered together.

The second meltblown fiber web (e.g., layer 106 in FIG. 1A and layer 148 in FIG. 1C) was the same in filter media 2 and filter media 3.

For filter media 3, the spunbond scrim fiber web was a Cerex fiber web having a basis weight of 20 g/m², a thickness of 4 mils, an air permeability of 990 cfm (1 cfm=1 ft³/min=0.028317 m³/min) at 125 Pa pressure drop, and an average fiber diameter of 19 microns. The meltblown fiber web in the support layer of filter media 3 had a basis weight of 11 g/m² (gsm), a thickness of 1.5 mil, and an average fiber diameter of 3.6 microns. The 11 gsm meltblown fiber web was deposited on top of the spunbond fiber web during the meltblowing process. After the meltblowing step, the meltblown fiber web and the spunbond fiber web were calendered on top of each other to form the scrim/meltblown support layer. Properties of the calendered scrim/meltblown support layer were as follows: basis weight of 31 g/m², thickness of 4.5 mil, air permeability of 205 cfm measured at 125 Pa pressure drop, mean flow pore size of 21 micron and maximum pore size of 72 micron.

Table 3 shows the structural and filtration properties of the filter media.

TABLE 3

Properties of Various Filter Media

| Filter media | Basis weight (g/m²) | Thickness (mil) | Air Perm at 125 Pa (CFM) | MFP (μm) | Max Pore (μm) | Max Pore/MFP | FWHM (μm) | 0.2 μm Efficiency |
|---|---|---|---|---|---|---|---|---|
| Filter media 2 | 48 | 5.6 | 1.5 | 0.28 | 0.6 | 2.14 | 0.035 | 98.9% ± 1.6% |
| Filter media 3 | 61 | 8.3 | 1.3 | 0.32 | 1.4 | 4.7 | 0.055 | 80% ± 20.2% |

Filter media 2, having a calendered meltblown support layer with a mean flow pore size of 15 microns, outperformed filter media 3 (e.g., higher 0.2 micron efficiency and higher air permeability, in Table 3), having a calendered scrim/meltblown support layer with a mean flow pore size of 21 microns. Without being bound by theory, the difference in performance between filter media 2 and filter media 3 was at least because the pore size of the calendered scrim/meltblown support layer in filter media 3 was larger than the pore size of the calendered meltblown backer (backer is also referred to herein as support layer) used in filter media 2.

Example 4

This example describes the filtration properties of standard 10" cartridge elements containing filter media, including a fibrous protective layer and a fibrous efficiency layer on a calendered fibrous support layer, compared to a commercial membrane filter. The filter media including fibrous layers had better efficiency, pressure drop, and dust holding capacity than the commercial membrane filter. The filter media were formed by electrospinning a fiber web onto a calendered meltblown fiber web (support layer) or meltblown/spunbond support layer and bonding a second meltblown fiber web to the electrospun web. For filter media 2 and filter media 3 that were used to form filter element 2 and filter element 3, bonding involved lamination, performed with a flatbed laminator at a temperature of 140.556° C., a pressure of 55 psi, and a line speed of 30 feet/min. For filter media 4 and filter media 5 that were used to form filter element 4 and filter element 5, bonding involved adhering the second meltblown fiber web, and the meltblown of the meltblown/spunbond support layer, to the electrospun fiber web using an adhesive. An acrylic copolymer solution (adhesive) was applied by spray lamination to a surface of the meltblown of the meltblown/spunbond support layer before electrospinning the electrospun web onto the support layer; the acrylic copolymer solution was applied by spray lamination to a surface of the second meltblown fiber web before adhering the second meltblown fiber web to an exposed surface of the electrospun fiber web. All fiber webs contained nylon fibers.

The support layer in filter media 3 and filter media 5 was as described in Example 3; the support layer contained a meltblown fiber web as described in Example 1 and a spunbond fiber web that were calendered together prior to formation of the electrospun fiber web on the calendered meltblown/spunbond fiber web.
The support layer in filter media 2 and filter media 4 contained a calendered meltblown fiber web as in the calendered meltblown fiber web in filter media 2 in Example 2.

To form the standard 10" cartridge elements, filter media were fed in roll format together with a layer of polypropylene scrim on the upstream and two layers of polypropylene scrim on the downstream side, to a blade pleater to create 1.27 cm pleat height across the media and the scrim layers. The pleated scrim-supported media was cut to an appropriate length and seamed to form an open-ended cylinder. The pleated media cylinder was inserted into a cartridge housing and enclosed by means of heat sealing the end caps of the housing.

A commercial membrane filter served as the control.

The control sample, characterized in Table 4, was a commercial Nylon 6,6 hydrophilic membrane with an absolute rating of 0.45 micron.

TABLE 4

| | Properties of commercial Nylon 6,6 membrane | | | | | | | |
|---|---|---|---|---|---|---|---|---|
| Filter media | Basis weight (g/m$^2$) | Thickness (mil) | Air Perm (CFM) (e.g., at 125 Pa) | MFP (um) | Max Pore (um) | Max Pore/MFP | FWHM (um) | 0.2 μm Efficiency |
| Commercial membrane | | | 0.3 | 0.7 | >2.7 | | 0.36-0.42 | 31.2% ± 20% |

As shown in FIGS. 3A-3D, regardless of the calendered support layer utilized (a calendered meltblown fiber web in filter element 2 and filter element 4, or a meltblown/spunbond support layer in filter element 3 and filter element 5) or the bonding technique (heat lamination in in filter element 2 and filter element 3, or adhesive bonding in filter element 4 and filter element 5), the filter elements containing filter media including fibrous layers had a higher 0.2 micron particulate efficiency, a better 0.3 micron particulate efficiency, a higher dust holding capacity (DHC) (and accordingly a higher lifetime), and a lower pressure drop at 15 lpm than the commercial membrane filter.

Figure 4:
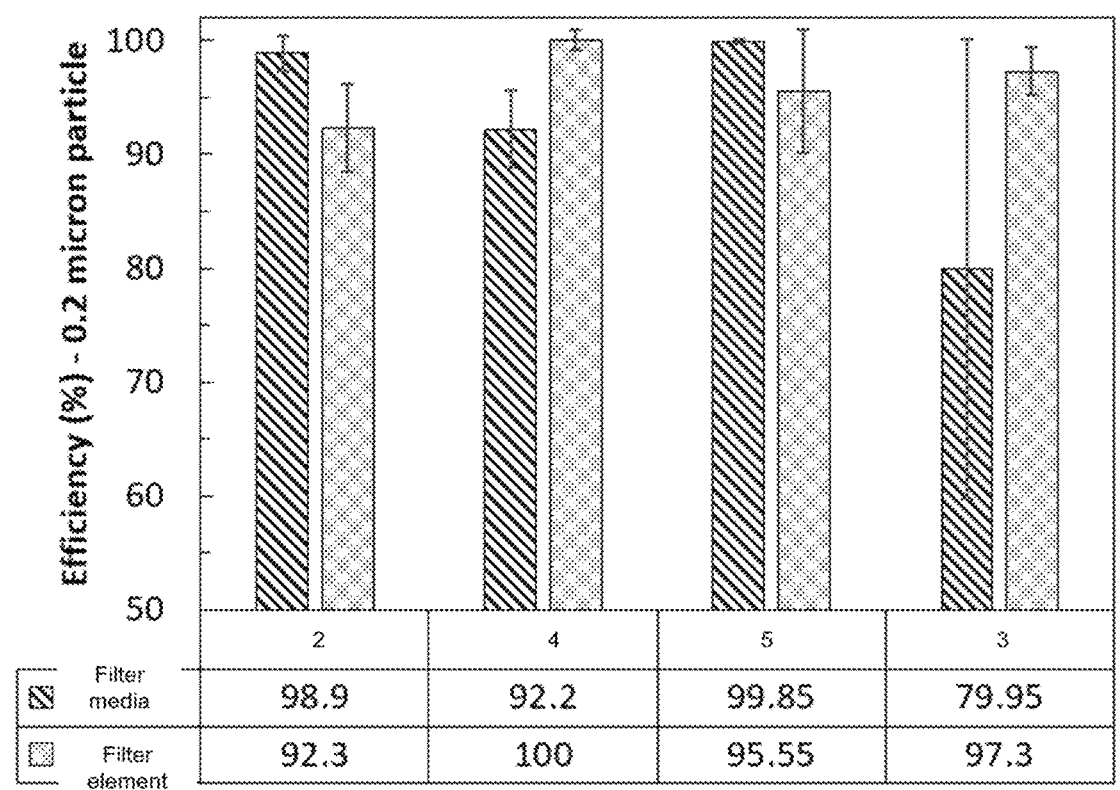
FIG. 4 is a plot of the 0.2 micron particle efficiency of various filter media in flatsheet (disk) and cartridge (element) configurations, according to certain embodiments.
Figure 5:
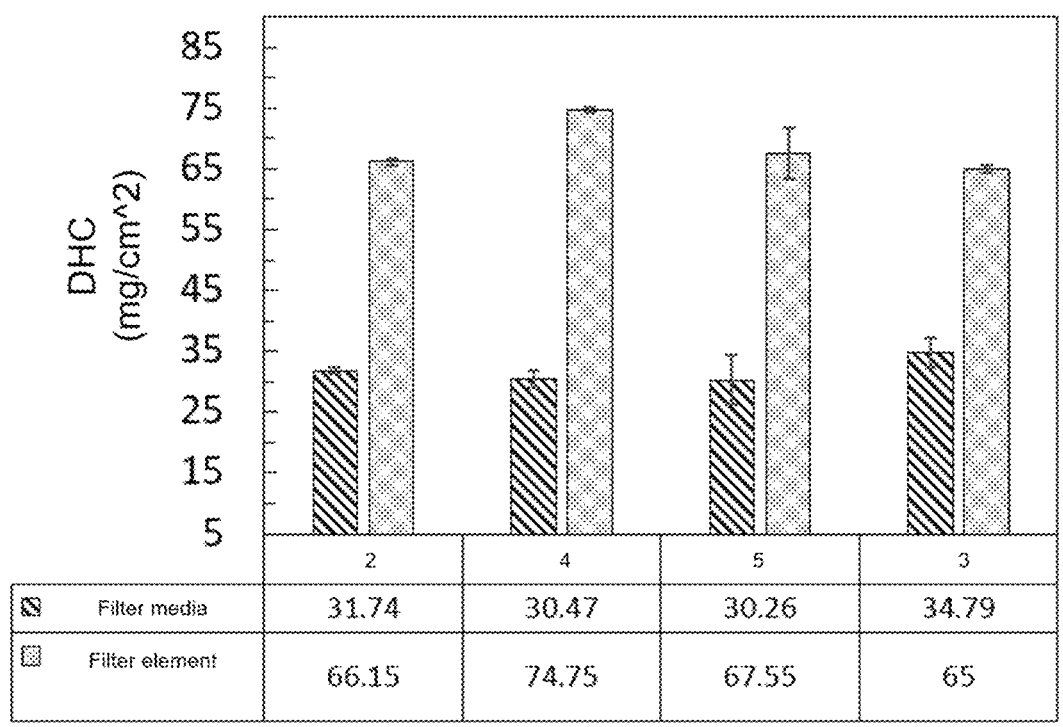
FIG. 5 is a plot of the dust holding capacity (DHC) (also referred to herein as dirt holding capacity) of various filter media in flatsheet (disk) and cartridge (element) configurations, according to certain embodiments.

The filter elements 2, 3, 4, and 5 had substantially the same filtration efficiencies as filter media 2, 3, 4, and 5 respectively, which suggests that the filter media 1) maintained their uniformity of pore size distribution in the filter elements; and 2) were generally able to withstand the stresses of the pleating process to form filter elements from the corresponding filter media without sacrificing filtration efficiency (e.g., filter elements 3, 4, and 5 FIG. 4). By contrast, efficiency losses after pleating are often observed for other filter media. In addition, in cartridge (filter element) form, the filter elements 2, 3, 4, and 5 had a significantly higher dust holding capacity than that in flatsheet (disk) form (for corresponding filter media 2, 3, 4, and 5) (e.g., FIG. 5).

Example 5

This example shows the filtration properties of a filter media 6, including a meltblown support layer and a poly (ether sulfone) nanofiber layer (efficiency layer). The support layer was a pre-calendered poly(butylene terephthalate) (PBT) meltblown layer with a basis weight of 40 g/m$^2$. The nanofiber layer (efficiency layer) was a poly(ether sulfone) (PES) nanofiber layer having a basis weight of 5 g/m$^2$ and an average fiber diameter of 120 nm, directly adjacent to and formed on the PBT meltblown by electrospinning to form a PBT/PES construct. The PBT/PES construct was laminated with a second PBT meltblown layer (basis weight 30 g/m$^2$), positioned directly adjacent to the other side of the nanofiber layer to form a laminated composite. Lamination settings were 165.6 degrees Celsius, 550 kPa, dwell time 17 seconds. The basis weight of the resulting filter media was 75.3 gsm, thickness 0.018 cm, mean flow pore size 0.22 microns, max pore size 1.15 microns, ratio (max pore size)/(mean flow pore size) 5.16.

The laminated composite was subsequently plasma-treated using RF Chemical Vapor Deposition with oxygen gas in order to create a hydrophilic media (filter media 9) fully water-wettable from its top to bottom surface. This media is compared with commercially available microfiltration PES membranes in Table 5.

TABLE 5

Properties of Various Filter Media

| Filter media | Basis weight (g/m$^2$) | Thickness (mil) | Air Perm ** (CFM) | MFP (μm) | Max Pore (μm) | Max Pore/MFP | Water permeability (ml/min · cm$^2$ · psi) | 0.2 μm Efficiency (%) |
|---|---|---|---|---|---|---|---|---|
| filter media 6 | 74 | 0.2 | 13.2 | 0.2 | 1.05 | 2.57 | 2.7 | 90 |
| *Membrane PES - 0.45 μm Vendor1 | 31 | 4.7 | 13.5 | 0.37 | 0.85 | 2.3 | 0.7 | 48 |
| *Membrane PES - 0.45 μm Vendor2 | | | | | | | 0.9 | 37 |
| *Membrane PES - 0.45 μm Vendor2 | 42.6 | 5.5 | 14.6 | 0.36 | 0.66 | 1.85 | 1.2 | 20 |
| *Membrane PES - 0.2 μm Vendor3 | | | | 0.32 | 0.42 | 1.32 | 0.5 | 55 |

*Commercially available microfiltration PES membranes
** at 2,500 Pa

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A filter media comprising:
a first fiber web comprising first fibers, wherein the first fibers have an average diameter of less than or equal to 0.5 microns, wherein the first fiber web has a thickness of less than or equal to 200 microns;
a calendered fiber web directly adjacent to the first fiber web; and
a third fiber web bonded to the first fiber web;
wherein the filter media has a full width at half maximum of a pore size distribution of less than or equal to 0.2 microns.

2. A filter media comprising:
a first fiber web comprising first fibers having an average diameter of less than or equal to 0.5 microns, wherein the first fiber web has a thickness of less than or equal to 200 microns;
a calendered fiber web directly adjacent to the first fiber web; and
a third fiber web bonded to the first fiber web;
wherein the filter media has a full width at half maximum of a pore size distribution of less than or equal to 0.2 microns and a ratio of maximum pore size to mean pore size of less than or equal to 5.0.

3. A filter media comprising:
a first fiber web comprising first fibers, wherein the first fibers have an average diameter of less than or equal to 0.5 microns, and wherein the first fiber web has a thickness of less than or equal to 200 microns;
a second fiber web directly adjacent to the first fiber web, wherein the second fiber web has a dry tensile strength in the machine direction of greater than or equal to 1 lb/in and less than or equal to 35 lb/in, a dry tensile elongation in the machine direction of greater than or equal to 10%, and a mean pore size of less than or equal to 30 microns; and
a third fiber web bonded to the first fiber web;
wherein the filter media has a full width at half maximum of a pore size distribution of less than or equal to 0.2 microns.

4. A filter media comprising:
a first fiber web comprising first fibers, wherein the first fibers have an average diameter of less than or equal to 0.5 microns, and wherein the first fiber web has a thickness of less than or equal to 200 microns;
a second fiber web directly adjacent to the first fiber web, wherein the second fiber web has a surface mean pore area of greater than or equal to 2 μm$^2$ and less than or equal to 50 μm$^2$, an intersection density of greater than or equal to 0.005 intersections/μm$^2$ and less than or equal to 0.025 intersections/μm$^2$, and a mean pore size of less than or equal to 30 microns; and
a third fiber web bonded to the first fiber web;
wherein the filter media has a full width at half maximum of a pore size distribution of less than or equal to 0.2 microns.

5. The filter media of claim 4, wherein the mean pore size of the second fiber web is greater than or equal to 1 micron.

6. The filter media of claim 1, wherein the filter media has a maximum pore size of greater than or equal to 0.1 microns and less than or equal to 2.5 microns.

7. The filter media of claim 1, wherein the root mean square surface roughness of the calendered fiber web is less than or equal to 12 microns.

8. The filter media of claim 1, wherein the calendered fiber web and/or the third fiber web comprises a meltblown fiber web.

9. The filter media of claim 1, wherein the first fiber web has a basis weight greater than or equal to 0.5 g/m$^2$.

10. The filter media of claim 1, wherein the filter media has a thickness of greater than or equal to 100 microns.

11. The filter media of claim 1, wherein the first fiber web comprises first fibers having an average diameter of greater than or equal to 0.05 microns and less than or equal to 0.5 microns.

12. A filter media of claim 1, wherein the third fiber web has an average fiber diameter greater than that of the first fiber web.

13. The filter media of claim 1, wherein the third fiber web has a maximum pore size of less than or equal to 70 microns.

14. The filter media of claim 1, wherein the filter media has an air permeability of less than or equal to 10 CFM for a pressure drop of 125 Pa.

15. The filter media of claim 1, wherein the filter media has a tensile strength in the machine direction of greater than or equal to 1 lb/in and less than or equal to 150 lb/in.

16. The filter media of claim 1, wherein the filter media has a tensile elongation in the machine direction of greater than or equal to 1% and less than or equal to 30%.

17. The filter media of claim 1, wherein the filter media has a basis weight of greater than or equal to 40 g/m$^2$.

18. The filter media of claim 11, wherein the filter media has a tensile strength in the machine direction of greater than or equal to 1 lb/in and less than or equal to 150 lb/in and the filter media has a tensile elongation in the machine direction of greater than or equal to 1% and less than or equal to 30%.

19. The filter media of claim 18, wherein the calendered fiber web comprises a meltblown fiber web and the third fiber web comprises a meltblown fiber web.

20. The filter media of claim 19, wherein the first fiber web has a basis weight greater than or equal to 0.5 g/m$^2$ and less than or equal to 10 g/m$^2$ and wherein the filter media has a thickness of greater than or equal to 100 microns and less than or equal to 400 microns.

* * * * *